United States Patent [19]
Yuki et al.

[11] Patent Number: 5,150,905
[45] Date of Patent: * Sep. 29, 1992

[54] RUBBER COMPOSITION AND GOLF BALL COMPRISING IT

[75] Inventors: Syoji Yuki, Osaka; Yasuyuki Tokui, Takatsuki; Kihachiro Nishiuchi, Tokushima; Kenichi Wada, Itano; Masayoshi Suzue, Tokushima; Takuo Morimoto, Kyoto, all of Japan

[73] Assignees: Asics Corporation, Kobe; Otsuka Chemical Company, Limited, Osaka, both of Japan

[*] Notice: The portion of the term of this patent subsequent to Aug. 25, 2009 has been disclaimed.

[21] Appl. No.: 551,163

[22] Filed: Jul. 11, 1990

Related U.S. Application Data

[62] Division of Ser. No. 204,310, Jun. 9, 1988, Pat. No. 4,955,966.

[30] Foreign Application Priority Data

| Jun. 11, 1987 | [JP] | Japan | 62-146019 |
| Jun. 12, 1987 | [JP] | Japan | 62-147218 |
| Jun. 12, 1987 | [JP] | Japan | 62-147219 |
| Jun. 12, 1987 | [JP] | Japan | 62-147220 |
| Jun. 12, 1987 | [JP] | Japan | 62-147221 |

[51] Int. Cl.$^5$ .................. A63D 37/06; A63B 37/12
[52] U.S. Cl. .................. 273/218; 523/206; 524/908; 260/998.14; 273/235 R
[58] Field of Search ............ 523/206; 524/508; 260/998.14; 273/218, 235 R

[56] References Cited

U.S. PATENT DOCUMENTS

| 3,862,259 | 1/1975 | Van Russelt et al. | 523/203 |
| 3,992,014 | 12/1976 | Retford | 524/908 |
| 3,997,356 | 12/1976 | Thurn et al. | 106/288 Q |
| 4,075,255 | 7/1978 | Moore et al. | 524/533 |
| 4,400,485 | 8/1983 | Mukamal et al. | 523/206 |
| 4,431,755 | 2/1984 | Weber et al. | 523/266 |
| 4,528,303 | 7/1985 | Segaud | 523/218 |
| 4,683,257 | 8/1987 | Kakiuchi et al. | 524/908 |
| 4,715,607 | 9/1987 | Llort et al. | 524/908 |
| 4,792,141 | 1/1988 | Llort | 524/908 |

FOREIGN PATENT DOCUMENTS

| 57-2348 | 1/1982 | Japan . |
| 57-74342 | 5/1982 | Japan . |
| 58-168638 | 8/1983 | Japan . |
| 59-1550 | 1/1984 | Japan . |
| 1349853 | 4/1974 | United Kingdom . |

OTHER PUBLICATIONS

Database WPIL No. 87-273844 Derwent Pub. London, GB; & JP-A-621090244 20-8-87.
Database WPIL No. 87-232026 Derwent Pub. London, GB; & JP-A-6215614811-07-87.
Database WPIL No. 84-168221 Derwent Pub. London, GB; & JP-A59091972 26-05-84.

Primary Examiner—Paul R. Michl
Assistant Examiner—Peter Szekely
Attorney, Agent, or Firm—Nixon & Vanderhye

[57] ABSTRACT

A rubber composition comprising at least one natural and/or synthetic rubber component(s), fine inorganic fibers subjected to a surface treatment with a surface treating agent and a non-sulfur type vulcanizing agent and a golf ball comprising the composition which exhibits excellent durability, bounce impact elasticity and excellent feeling upon hitting.

6 Claims, No Drawings

2

RUBBER COMPOSITION AND GOLF BALL COMPRISING IT

This is a division of application Ser. No. 07/204,310 filed Jun. 9, 1988, now U.S. Pat. No. 4,955,966.

BACKGROUND OF THE INVENTION

1. Field of the Invention

This invention relates to a rubber composition having improved mechanical properties, particularly an excellent compressive strength.

This invention also relates to a golf ball which comprises the rubber composition mentioned above and has excellent durability, bounce impact elasticity (flight characteristics) and excellent feeling upon hitting.

This invention further relates to a rubber composition particularly suitable for a cover layer of a golf ball.

2. Description of the Prior Art

Rubber compositions, unlike plastics, exhibit viscoelasticity and, by the virture of this property, have found utility in a wide variety of fields such as civil engineering, the machine industry, electrical industry and chemical industry. In recent years, rubber compositions have been required to possess high hardness, high elasticity, high strength, extremely high compressive strength and excellent wear resistance to meet diversified needs by the same token that high-strength plastics had been developed. Further, those rubber composition are in most cases required to possess at least two of such highly improved properties simultaneously.

Golf balls, for example, are required to ensure flight stability, long flight distance characteristics and the like. The rubber compositions used in golf balls, therefore, are required to have well controlled properties such as bounce impact elasticity, compressive strength and hardness, and various rubber compositions having improved properties have been proposed.

For example, a golf ball composed of a composition containing metal salt monomers of an $\alpha,\beta$-monoethylenically unsaturated carboxylic acid has been proposed. In this type of golf ball, the monomers had been grafted on the main chain of the rubber component of polybutadiene in the presence of a free radical initiator to function as a co-cross-linking agent, and thereby hardness is imparted to the ball. However, the sufficient durability and bounce impact elasticity have not been obtained with such golf ball. The hardness of a golf ball can be controlled by the amount of the cross-linking agent, however, increased amount of the cross-linking agent would cause a decline of the bounce impact elasticity.

For the purpose of the improvement of hardness and wear resistance of rubber compositions, various compositions incorporated with finely divided inorganic material have been also proposed, however, the decrease of the elasticity and decrease of compression fracture strength are inevitably caused without exception. The incorporation of long staple fibers has been proved to be effective for enhancing the strength of the composition, however, the incorporation of such fibers impairs the surface smoothness and also fails to produce any significant improvement in elasticity and hardness.

Based on the technical concept of those conventional methods mentioned above, use of fine fibers in a rubber composition was proposed, however, they exhibit poor wettability to a rubber material to cause slippage between their surfaces and the rubber material. Because of the slippage, it is difficult to obtain the desired properties in such composite material, though the fine fibers can be dispersed uniformly in a given rubber composition. Therefore, a surface treatment of the fibers has often remained as a problem to be solved. It is well known that hydrolyzable silyl compounds are effective surface treating agents, but the compound(s) must be selected to suit the particular kind of a rubber component used in the composition and the surface treatment with the compound(s) requires highly advanced skill.

We have already found that a sulfur-containing silyl compound possesses an excellent affinity to rubber components and serves as an excellent agent for the surface treatment mentioned above. However, heretofore such sulfur-containing silyl compounds have been invariably directed to sulfur vulcanizing systems, and it has been believed that the sulfur-containing silyl compound cannot be used for a non-sulfur vulcanizing system since it has been supposed that the non-sulfur vulcanization would be inhibited with the sulfur-containing silyl compound judging from its vulcanization mechanism.

SUMMARY OF THE INVENTION

An object of the invention is to provide a high-performance rubber composition having high elasticity, high strength and high compression property, and vulcanizable with a non-sulfur type vulcanizing agent.

Another object of the invention is to provide a golf ball which has excellent durability, bounce impact elasticity and hardness and which can give excellent feeling upon hitting with a golf club and a long flight distance.

Yet another object of the invention is to provide a rubber composition suitable for molding a cover layer of a golf ball, which has an excellent durability, bounce impact elasticity and hardness and which can give an excellent feeling upon hitting and a long flight distance when used in a golf ball.

The first aspect of the invention provides a rubber composition comprising at least one natural and/or synthetic rubber component(s), fine inorganic fibers subjected to a surface treatment with a surface treating agent and a non-sulfur type vulcanizing agent. The rubber composition may further comprise cross-linking monomers.

The second aspect of the invention provides a golf ball comprising the rubber composition mentioned above. The golf ball of the present invention includes:

a) a solid golf ball made solely of the rubber composition mentioned above, b) a two-piece golf ball which comprises a core of elastic rubber and a cover layer of a hard elastomer, wherein the core and/or the cover layer are/is composed of the rubber composition mentioned above, c) a three-piece golf ball which comprises a core of elastic rubber, an intermediate layer of elastic rubber and a cover layer of hard elastomer, wherein at least one of the core, the intermediate layer and the cover layer is(are) composed of the rubber composition mentioned above, and d) a thread wound golf ball which comprises a spherical core, an intermediate layer formed by winding a elastic thread on the spherical core with high tension and a cover layer, wherein the core and/or the cover layer are/is composed of the rubber composition mentioned above.

The third aspect of the invention provides a rubber composition for a cover layer of a golf ball, which comprises at least one natural and/or synthetic rubber component(s) and alkali metal titanate fibers subjected to a surface treatment with a surface treating agent.

DETAILED DESCRIPTION OF THE INVENTION

As the rubber component of the composition of the invention, any of the various known rubbers can be used. Examples of the rubber component include natural rubber (NR), isoprene rubber (IR), styrene-butadiene rubber (SBR), nitrile rubber (NBR), butadiene rubber (BR), chloroprene rubber (CR), butyl rubber (IIR), acrylic rubber (AR), urethane rubber (UR), silicone rubber (SiR), fluorocarbon rubber (FR), ethylene-propylene rubber (EPR), chlorosulphonated polyethylene (CSM), ethylene-vinyl acetate rubber (EVA), chlorinated polyethylene (CPE), polyisobutylene (PIB), alfin rubber (AL), polyester rubber (ESR), epichlorohydrin rubber (ECR), chlorinated isobutylene-isoprene rubber (CIR), nitrile-isobutylene rubber (NJR), ionomer resin, trans-polyisoprene resin and the like.

The rubber component preferably contains at least 30% by weight of polybutadiene of cis-1,4-configuration, because the hardness and bounce impact elasticity of the composition containing such rubber component are particularly improved. Though it is not clear why this improvement is caused, it is supposed that the reinforcing effect efficiently utilizing the shape of the fine fibers contained in the composition is obtained due to the reaction of the sulfur component of the surface treating agent with polybutadiene of cis-1,4-configuration. This theory is supported by the fact that a greater improvement of hardness and bounce of impact elasticity can be obtained in the compositions utilizing such sulfur-containing surface treating agent than those utilizing a conventional surface treating agent containing no sulfur component, for example, alkoxysilane type surface treating agent such as methyltrimethoxysilane, methyltriethoxysilane, $\gamma$-glycidoxypropyltrimethoxysilane and $\gamma$-aminopropyltriethoxysilane.

When the rubber composition of the present invention is used as a hard elastomer of the surface cover layer in a multi-layer golf-ball such as two-piece golf ball, three-piece golf ball, thread wound golf ball and the like, the rubber component is preferably ionomer resin or trans-polyisoprene resin from the viewpoint of the high elasticity and wear resistance.

As an example of the ionomer resin, there can be mentioned an ionic copolymer which is obtained by reacting a copolymer of an $\alpha$-olefin represented by the general formula of R—CH=CH$_2$ wherein R represents an alkyl group having 1 to 8 carbon atoms and an $\alpha,\beta$-unsaturated carboxylic acid having 3 to 8 carbon atoms with a metal compound.

Examples of the $\alpha$-olefin mentioned above include ethylene, propylene, butene-1, pentene-1, hexene-1, heptene-1, 3-methylbutene-1, 4-methylpentene-1 and the like. Though $\alpha$-olefins having larger numbers of carbon atoms than those mentioned above may be used in the present invention, they are unsuitable for practical use because of their unavailability. These $\alpha$-olefins may be used alone or in any combination thereof. The content of the $\alpha$-olefins in the copolymer is preferably at least 50 molar %, particularly at least 80 molar % from the view point of the moldability and physical properties of the composition.

Examples of the $\alpha,\beta$-unsaturated carboxylic acid having 3 to 8 carbon atoms include acrylic acid, methacrylic acid, ethacrylic acid, itaconic acid, maleic acid, fumaric acid; monesters of dicarboxylic acid such as monomethyl maleate and monoethyl fumarate; and anhydrides of dicarboxylic acid such as maleic anhydride, but it is not limited to those specific examples. These $\alpha,\beta$-unsaturated carboxylic acids may be used alone or in any combination thereof. The content of $\alpha,\beta$-unsaturated carboxylic acid in the copolymer is preferably in the range of 0.5 to 25 mole %, particularly in the range of 1 to 10 mole %. Further, the copolymer may contain any monomer component other than the $\alpha$-olefin and $\alpha,\beta$-unsaturated carboxylic acid, which is copolymerizable with the $\alpha$-olefin and $\alpha,\beta$-unsaturated carboxylic acid to replace a part of the $\alpha$-olefin. Examples of such monomer include styrene, vinyl chloride, vinyl acetate, acrylonitrile vinyl methyl ether and the like.

The copolymer composed of the $\alpha$-olefin and the $\alpha,\beta$-unsaturated carboxylic acid is not limited to those obtained by directly copolymerizing a mixture of the monomers, and it also includes those obtained by graft polymerization where the $\alpha,\beta$-unsaturated carboxylic acid monomers are grafted on a base polymer produced from the $\alpha$-olefin.

The ionic copolymer can be obtained by reacting the copolymer obtained as above with a metal compound generating metal ions to neutralize the copolymer.

Examples of the metal ion suitable for the preparation of the ionic copolymer include those of the metals of Group I and Group II of the periodic table, i.e., Na, K, Li, Cs, Cu, Ag, Be, Ng, Ca, Sr, Ba, Zn, Cd and Hg, and they can be used alone or in any combination thereof. Owing to the employment of those metal ions, cross-linkings are advantageously formed during the formation of the ionic copolymer. Among those metal ions cited above, Na and Zn are particularly preferable from the viewpoint of the melt workability of the copolymer and the physical properties exhibited in the solid state of the copolymer. The amount of the ion to be used or the degree of the neutralization of the copolymer can not be specifically fixed, because they are variable depending on the desired properties in the solid state and melting property of the ionic copolymer. In order to significantly change the properties of the copolymer in the solid state, the amount of the ion is preferably enough to neutralize at least 10% of the carboxyl groups in the copolymer, and the neutralization can be generally effected up to about 90% of the carboxyl groups in the copolymer. The degree of neutralization for optimizing the physical properties of the copolymer also can not specifically fixed, because the optimum properties are variable depending on the use for which the copolymer is intended and further because the physical properties of the ionic copolymer are variable depending on the amount of the carboxylic group in the copolymer, the molecular weight of the copolymer and the like. However, it is generally preferable to neutralize at least 50% of the carboxyl groups in the copolymer.

The metal ions mentioned above can be obtained by dissolving a metal compound generating such ions, for example, an inorganic metal compound such as sodium hydroxide and sodium carbonate and an organic metal compound such as sodium methoxide, sodium formate and sodium acetate in water or an organic solvent such as methanol.

The method for the production of the ionic copolymer from the aforementioned copolymer and the metal ion is not particularly limited, and any conventional method can be used for the production.

The molecular weight of the ionic copolymer can be conveniently expressed with the melt index (MI), which serves as a criterion of the melt viscosity and described in ASTM D 1238. The MI of the ionic copolymer is advantageously in the range of 0.1 to 100 g/10 minutes (190° C.), particularly in the range of 0.5 to 20 g/10 minutes (190° C.). The ionic copolymer of which MI is approximately in the range of 0.1 to 100 g/10 minutes has the excellent melt workability and exhibits high toughness, suitable elasticity and flexibility in the solid state.

The trans-polyisoprene resin used in the present invention occurs as a main component of natural resin such as balata and gutta-percha obtainable from natural plants and it has a molecular configuration of trans-1,4-polyisoprene. As a typical commercially available product of the resin, Kuraray Trans-Polyisoprene TP-301, Kuraray Isoprene Chemical Co., Ltd. can be mentioned.

The terms of "fine inorganic fibers" in the present invention refers to inorganic fibers having an average length of 1 μm to 1 mm, preferably 5 to 300 μm, and an aspect ratio of 5 to 1,000, preferably 10 to 300. The fine inorganic fibers having an average length and aspect ratio in the range defined above exhibit an excellent reinforcing property and uniform dispersibility, and thereby they can produce an uniform strength distribution of the composition. As the fine inorganic fibers of the present invention, inorganic whiskers are particularly preferred. Examples of the fine inorganic fibers include alumina fibers, silicic acid fibers, titania fibers, magnesium silicate fibers, calcium silicate fibers, calcium sulfate fibers, silicon carbide fibers, titanium carbide fibers, boron carbide fibers, boron nitride fibers, titanium nitride fibers, carbon nitride fibers, carbon boride fibers, silicon boride fibers, titanium boride fibers, sodium titanate fibers, potassium titanate fibers, lithium titanate fibers, calcium titanate fibers, magnesium titanate fibers, barium titanate fibers and the like. Among those fine inorganic fibers exemplified above, the potassium titanate fibers are particularly preferable material, because they exhibit an excellent reinforcing effect and heat resistance, permit the coloration of a desired hue owing to the outstanding whiteness thereof, ensure the easy production of fine fibers of uniform length and show the uniform dispersibility in the composite material.

The terms "potassium titanate fibers" in the present invention refers to single crystal fibers represented by the formula: $K_2O \cdot nTiO_2$ or by the general formula: $K_2O \cdot nTiO_2 \cdot \frac{1}{2}H_2O$ wherein n is an integer of 2 to 8. Examples of the potassium titanate fibers include potassium tetratitanate fibers, potassium hexatitanate fibers and potassium octatitanate fibers. These potassium titanate fibers can be used alone or in any combination thereof. The potassium titanate fibers preferably possess an average fiber diameter in the range of 0.1 to 2 μm, average fiber length in the range of 5 to 100 μm and aspect ratio in the range of 10 to 200. The average fiber diameter and the average fiber length are determined by measuring the values of each fiber by means of a scanning electron microscope and calculating the average of those values of at least 10 fibers per each of at least five fields of the view. The aspect ratio is obtained by dividing the average fiber length by the average fiber diameter.

As the surface treating agent for the fine inorganic fibers of the invention, sulfur-containing silane compounds such as a silane compound bearing mercapto group and a sulfide compound bearing silyl group can be mentioned.

Typical examples of the silane compound bearing mercapto group mentioned above are those compound represented by the general formula:

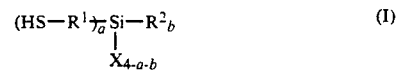

wherein each $R^1$ independently represents a substituted or unsubstituted divalent hydrocarbon group of 2 to 6 carbon atoms, each $R^2$ independently represents a substituted or unsubstituted monovalent hydrocarbon group, each X independently represents a hydrolyzable group, a is an integer of from 1 to 3, and b is an integer of from 0 to 2 with proviso of $1 \leq (a+b) \leq 3$.

Examples of $R^1$ include ethylene group, trimethylene group, tetramethylene group, pentamethylene group, hexamethylene group and the like. Among the examples mentioned above, $R^1$ is preferably ethylene group or trimethylene group, particularly trimethylene group.

Examples of $R^2$ include an alkyl group such as methyl group, ethyl group, propyl group, butyl group, pentyl group, hexyl group, octyl group, decyl group, dodecyl group and octadecyl group; alkenyl group such as vinyl group and allyl group; aryl group such as phenyl group and tolyl group; aralkyl group such as benzyl group, β-phenylethyl group and β-phenylpropyl group; and substituted hydrocarbon group such as β-cyanoethyl group, γ-chloropropyl group, 3,3,3-trifluoropropyl group and chlorophenyl group. The group of $R_2$ is selected depending on the kind of the rubber component and the purpose to which the product is intended. The group of $R^2$ of a long chain alkyl is suitable for a rubber component containing no aromatic ring, $R^2$ of aryl group or aralkyl group is suitable for a rubber component containing aromatic rings and $R^2$ of a substituted hydrocarbon group is suitable for a rubber component containing substituents such as halogen atoms or nitrile groups.

The symbol X represents a hydrolyzable group bonding to a silicon atom. Examples of the group X include an alkoxy group such as methoxy group, ethoxy group, propoxy group and butoxy group; alkoxyalkoxy group such as β-methoxyethoxy group, β-ethoxyethoxy group and β-butoxyethoxy group; enoxy group such as isopropenyloxy group; ketoximato group such as dimethyl ketoximato group and methylethyl ketoximato group; amino group such as diethylamino group and dibutylamino group; aminooxy group such as diethylaminooxy group; acyloxy group such as acetoxy group and octanoyloxy group; and amide group such as N-methylacetamide group. The group X is preferably selected from lower alkoxy groups of 1 to 4 carbon atoms from the view point of the reactivity with the surface of fine inorganic fibers, and methoxy group is most preferable because of its outstanding reactivity.

The symbol a denotes an integer of from 1 to 3, preferably less than 2 in average, and b denotes an integer of from 0 to 2, preferably not more than 1 in average. If the value of a and b are unduly large, the number of the hydrolyzable groups become small and thereby the reactivity of the compound with the inorganic fibers is lowered. If the value of a is unduly small, the effect of the mercapto group on the rubber component is lowered. Accordingly, silane compound bearing mercapto group is preferably controlled such that the average value of a is 1 and that the average value of b is less than 1.

Typical examples of the sulfide compound bearing silyl group are those compounds represented by the following general formula;

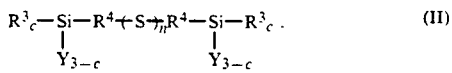

$$R^3_c\!-\!\underset{Y_{3-c}}{Si}\!-\!R^4\!+\!S\!\!\rightarrow_{\!n}\!R^4\!-\!\underset{Y_{3-c}}{Si}\!-\!R^3_c \quad \text{(II)}$$

wherein each $R^3$ independently represents a substituted or unsubstituted monovalent hydrocarbon group, each $R^4$ independently represents a substituted or unsubstituted hydrocarbon group of 2 to 4 carbon atoms, each Y independently represents a hydrolyzable group, c is an integer of from 0 to 2 and n is an integer of from 1 to 6.

Examples of $R^3$ include alkyl group such as methyl group, ethyl group, propyl group, butyl group, pentyl group, hexyl group, octyl group, decyl group, dodecyl group and octadecyl group; alkenyl group such as vinyl group and allyl group; aryl group such as phenyl group and tolyl group; aralkyl group such as benzyl group, β-phenylethyl group and β-phenylpropyl group; and substituted hydrocarbon group such as β-cyanoethyl group, γ-chloropropyl group, 3,3,3-trifluoropropyl group and chlorophenyl group. The group of $R^3$ is selected depending on the kind of the rubber component and the purpose to which the product is intended. The group of $R^3$ of a long chain alkyl is suitable for a rubber component containing no aromatic ring, $R^3$ of aryl group or aralkyl group is suitable for a rubber component containing aromatic rings and $R^3$ of a substituted hydrocarbon group is suitable for a rubber component containing substituents such as halogen atoms or nitrile groups.

Examples of $R^4$ include ethylene group, trimethylene group, tetramethylene group, pentamethylene group, hexamethylene group and the like. Among the examples mentioned above, $R^4$ is preferably ethylene group or trimethylene group, particularly trimethylene group.

The symbol Y represents a hydrolyzable group bonding to the silicon atom. Examples of the group Y include an alkoxy group such as methoxy group, ethoxy group, propoxy group and butoxy group; alkoxyalkoxy group such as β-methoxyethoxy group, β-ethoxyethoxy group and β-butoxyethoxy group; enoxy group such as isopropenyloxy group; ketoximato group such as dimethyl ketoximato group and methylethyl ketoximato group; amino group such as diethylamino group and dibutylamino group; aminooxy group such as diethylaminooxy group; acyloxy group such as acetoxy group and octanoyloxy group; and amide group such as N-methylacetamide group. The group Y is preferably selected from lower alkoxy groups of 1 to 4 carbon atoms from the view point of the reactivity with the surface of fine inorganic fibers, and propoxy group is particularly preferable because the compound having propoxy groups as the group of Y can be easily synthesized and have good stability.

The symbol c denotes an integer of from 0 to 2. The sulfide compound bearing silyl group represented by the formula II preferably contains at least one, preferably two of the hydrolyzable groups reactive to the surface of the inorganic fibers. Therefore, the value of c is preferably less than 2 in average. The symbol n denotes an integer of from 1 to 6, and the average value of n is preferably 2 to 4 from the viewpoint of the ease of synthesis, affinity for the rubber and inability to inhibit the vulcanization of the compound.

Those surface treating agents defined above can be used alone or in any combination thereof.

In the present invention, the fine inorganic fibers are treated with aforementioned surface treating agent. The amount of the surface treating agent is preferably in the range of about 0.05% to 10% by weight based on the amount of the fibers. So long as the amount is in this range, the surface treating agent sufficiently improves the surface property of the fine inorganic fibers, and consequently the physical properties of the rubber composition are improved without inhibiting the subsequent vulcanization.

The treatment with the surface treating agent can be effected according to any of the conventional methods. For example, the treatment can be carried out by spraying the surface treating agent or the dilution of the surface treating agent on the fine inorganic fibers, or mixing the agent with the fibers homogeneously, or impregnating the fibers with the agent to deposit the agent on the surface of the fibers uniformly. Then, the agent on the fibers are dried by heating or hydrolyzed to be immobilized on the fibers as a uniform coating.

The surface treating agent used in the invention contains a sulfur atom in the molecular structure. Hitherto, such compounds, particularly those containing a sulfur atom in a terminal mercapto group have been known to cause an inhibition of the vulcanization utilizing a peroxide type vulcanizing agent and impairs the physical properties of rubber. However, it was found that the surface treating agent manifested the surface treating effect such that the rubber composition has a sufficient hardness and compressive strength with uniform vulcanization, i.e., without any inhibition of the vulcanization. In the rubber composition, the rubber component adheres to the inorganic fibers strongly and the slippage at the interface between the fibrous filler and the rubber matrix is suppressed, the slippage being recognized to cause the deterioration of the physical properties of the rubber composition as described above.

As the cross-linking monomer used in the present invention, unsaturated carboxylic acids, salts thereof and other unsaturated vinyl compounds may be used. Examples of the unsaturated carboxylic acid include acrylic acid, methacrylic acid, 2-acetoaminoacrylic acid, β,β-dimethacrylic acid, ethacrylic acid, α-chloroacrylic acid, cinnamic acid, acotinic acid, 2-ethyl-3-propylacrylic acid, crotonic acid, aminocrotonic acid, acidophoshydroxyethyl(meth)acrylate, β-acryloxypropionic acid, 2-butene-1,4-dicarboxylic acid, sorbic acid, acetylcarboxylic acid, N-butylmaleamidic acid, fumaric acid, maleic acid, chloromaleic acid, di-n-butylmaleamidic acid, N,N-dimethylmaleamidic acid, N-ethylmaleamidic acid, N-phenylmaleamidic acid. dichrolomaleic acid, dihydroxymaleic acid, allylarsonic acid, chloroendeic acid, itaconic acid, benzoylacrylic acid and the like. Examples of the other unsaturated vinyl compound include vinyl compound such as vinyl acetate, vinyl propionate, vinyl caproate, styrene, vinyltoluene and divinylbenzene; alkyl ester of acrylic acid such as alkyl acrylate and alkyl methacrylate; (meth)acrylic acid derivatives such as (meth)acrylonitrile, meth)acrylamide and glycidyl (meth)acrylate; and triallylisocyanurate. Among those compound mentioned above, it is particularly preferable to select the cross-linking monomer from the group of acrylic acid, methacrylic acid, cinnamic acid, acotinic acid, crotonic acid, itaconic acid and benzoylacrylic acid. Those compounds can be used alone or in any combination thereof.

The metal salts of the unsaturated carboxylic acid mentioned above can be also used as the cross-linking monomer of the present invention. Examples of the metal for those metal salts include lithium, sodium, potassium, strontium, zinc, magnesium, calcium, barium, cadmium, lead, zirconium, beryllium, copper, aluminium, tin, iron, antimony, bismuth, molybdenum, tungsten, nickel and the like, and they can be used alone or in any combination thereof. Metal salt of the metal ion having a valency of at least 2 is particularly preferable since they enhance the cross-linking efficiency. Calcium, zinc, magnesium and zirconium are particularly preferred because of their availability and low toxicity. Those metals may be incorporated into the composition either by using the metal salts of the unsaturated carboxylic acid obtained by the reaction of the metallic compound and the unsaturated carboxylic acid, or by adding the unsaturated carboxylic acid and the metallic compound such as metal oxide, metal hydroxide, metal carbonate and the like separately into the rubber component and reacting them in the mixture system to form metal salts of the unsaturated carboxylic acid. The amount of the cross-linking monomer used in the rubber composition of the present invention is not particularly limited, however, it is preferable to incorporate 0.1 to 50 parts by weight, particularly 1 to 15 parts by weight of the cross-linking agent based on 100 parts by weight of the rubber component to facilitate the control of hardness and bounce impact elasticity of the composition.

Examples of the non-sulfur type vulcanizing agent used in the present invention include metal oxide such as magnesium oxide, lead oxide and zinc oxide; cross-linking resin such as phenol resin, melamine formaldehyde resin, urethane resin polyester resin, polyamide resin and epoxy resin; low molecular weight compound and modified compound of those resins; and organic peroxide such as diacetyl peroxide, dibenzoyl peroxide, dicapryl peroxide, di(p-chlorobenzoyl) peroxide, didecanoyl peroxide, di(2,4-dichlorobenzoyl) peroxide, diisobutyl peroxide, diisononanoyl peroxide, dilauroyl peroxide, dipelargonyl peroxide, dipropynyl peroxide, di($\beta$-carboxypropinoyl) peroxide, methyl ethyl ketone peroxide, cyclohexanone peroxide, dihydroxy-dimethyl-dioxacyclopentane, t-butyl peroxide, t-butylperoxy(2-ethylhexanoate), t-butylperoxyisobutylate, O,O-t-butyl-O-isopropylmonoperoxycarbonate, t-butylperoxypivalate, dimethyl-di(benzoylperoxy)hexane, t-butylperoxy-(2-ethylbutylate), di-t-butyl peroxide, dicumyl peroxide, dimethyl-bis(t-butylperoxy)hexane, t-butyl hydroperoxide, cumyl hydroperoxide, bis(t-butylperoxy)trimethylcyclohexane and n-butyl-bis(t-butylperoxy)-valerate and the like. Among those non-sulfur type vulcanizing agent mentioned above, dicumyl peroxide, cumyl hydroperoxide, t-butyl peroxide, dibutyl peroxide, bis(t-butylperoxy trimethylcyclohexane and n-butyl-bis(t-butylperoxy)valerate are particularly preferred because those vulcanizing agent can proceed the vulcanization uniformly as favored by the relation between the vulcanizing temperature and the half-life. Those non-sulfur type vulcanizing agent can be used alone or in any combination thereof. The amount of the vulcanizing agent used in the rubber composition may be variable depending on the factors such as the type of rubber, the purpose of the rubber composition to be intended to and the like, however, it is usually preferable to use it in an amount of 0.1 to 15 weight % of the rubber component.

The rubber composition of the present invention may be incorporated with various known additives, for example, vulcanization accelerator, vulcanization retarder, antioxidant, plasticizer, peptizer, tackifier, antitack agent, sponging agent, dispersant, dusting agent, mold release agent, solvent, softening agent and the like. Additionally, various inorganic fillers for reinforcing the material and any desired pigment and dye for coloring the composition may be also incorporated in the rubber composition. Examples of the inorganic filler include clayish powders of carbon black, magnesium carbonate, zinc oxide, calcium carbonate, barium sulfate, aluminium hydroxide, aluminium oxide, silica powder, titanium dioxide, mica, talc, clay, diatomaceous earth, kaolin and the like. The rubber composition of the present invention may also contain any of organic modifiers conventionally used, and examples of such organic modifier include cumarone-indene resin, phenol resin, polystyrene resin, acrylic resin, polyamide resin, epoxy resin, urethane resin, polyolefin resin and the like. Further, the rubber composition of the invention may include long fiber reinforcing material, for example, inorganic fibers such as glass fibers, carbon fibers, metal fibers, quartz fibers and ceramic fibers, and organic fibers such as nylon fibers, vinylon fibers, polyester fibers, aromatic polyamide fibers, polyimide fibers and aromatic polyether amide fibers.

The rubber composition of the invention can be produced by kneading one or more rubber components with the fine inorganic fibers of which surfaces are treated with the surface treating agent, the non-sulfur type vulcanizing agent, and optionally with cross-linking monomers, various additives and auxiliaries by a conventional method. The vulcanization of the rubber composition according to the present invention can be also carried out in a conventional manner, and the vulcanization is preferably carried out at a temperature of from 80° C. to 180° C. for 5 to 60 minutes.

The mixing ratio of the each component is not specifically limited and can varied depending on the kind of the rubber component used in the composition and the purpose for which the composition is intended to be used. As concerns the amount of the surface treated fine inorganic fibers, it is preferable to incorporate 2 to 100 parts by weight, particularly 10 to 50 parts by weight of the surface treated fine inorganic fibers into 100 weight parts of the rubber component. When the content of the fibers is less than the lower limit of the range, it became difficult to obtain a sufficient strength of the composition though it has a sufficient flexibility, and when the content of the fibers exceeds the upper limit of the range, the composition become unsuitable for a practical use because it gets excessive hardness and poor elongation ratio while the strength is enhanced.

The rubber composition according to the present invention can be used for various purposes, for example, industrial materials such as rubber roller, sporting goods such as golf ball, baseball, shoe soles and many applications in other fields such as electronic device industry, telecommunication device industry and chemical industry.

The solid golf ball of the present invention is prepared by molding the rubber composition of the present invention, which has been kneaded and vulcanized as described above, in the shape of a golf ball.

The two-piece golf ball of the present invention can be produced by covering a core of an elastic rubber with a layer of hard elastomer and molding the resultant composite in the shape of a golf ball having desired surface characteristics such as dimples, wherein the core and/or the cover are/is composed of the rubber composition of the present invention.

The three-piece golf ball of the present invention can be produced by covering a core of an elastic rubber with a intermediate layer, molding the intermediate layer, vulcanizing the resultant composite, then covering the intermediate layer with a cover layer, molding the resultant composite in the shape of a golf ball and optionally further vulcanizing the molded golf ball, wherein at least one of the core, the intermediate layer and cover layer is(are) composed of the rubber composition of the present invention. The three-piece golf ball of the present invention can be also produced by a single molding process, that is, by covering the core with the intermediate layer and the cover layer successively, then molding and vulcanizing the resultant composite.

The thread wound golf ball of the present invention can be produced by winding a core of elastic rubber with an elastic thread in a conventional manner, covering the thread wound core with hard elastomer and molding the resultant composite in the shape of a golf ball having desired surface characteristics such as dimples. Any known elastic thread can be employed for the preparation, and the examples of the elastic thread include a therad produced by a known process for the preparation of the rubber thread utilizing a rubber material such as natural rubber (NR), polyisoprene rubber (IR) and a blend material of these rubber materials.

When the elastic rubber or the hard elastomer used in the golf ball of the invention is not composed of the rubber composition of the invention, they may be composed of any of known rubber materials conventionally used. Particularly, ionomer resin and trans-polyisoprene resin, which are also described hereinbefore as a rubber component used in the rubber composition of the invention, can be suitably used as the material for the hard elastomer of the cover layer.

The golf ball according to the present invention may be treated on its surface with a conventional coating agent.

The golf ball cover composition of the present invention can be obtained by mixing the rubber component mentioned hereinbefore and alkali metal titanate fibers mentioned hereinbefore as the fine inorganic fiber material in a conventional kneader. By covering a golf ball core with the golf ball cover composition according to the invention and molding the resultant composite, for example, by means of an injection molding machine, a golf ball having an excellent bounce impact elasticity can be obtained.

As the rubber component of the golf ball cover composition of the present invention, ionomer resin and trans-polyisoprene resin, which are described above, are particularly preferable since they permit a high elasticity and good wear resistance of the composition.

EXAMPLES

Now, the present invention will be described more specifically with reference to working examples and comparative experiments hereafter, however, it should be noted that the present invention is not intended to be restricted within those specific examples.

In the attached tables, *1, *2 and *3 denote products of Japan Synthetic Rubber Co., Ltd. marketed under product codes of "BR-11", "STEREON 720" and "IR-2200", respectively, *4 denotes a product of Seido Kagaku marketed under a product code of "Zinc White No. 3" and *5 denotes a product of Nippon Silica Co., Ltd. marketed under a trade name of "Nipseal VN 3AQ".

The potassium titanate fine fibers (untreated) were obtained from Otsuka Chemical Co., Ltd. as a commercially available product under a trade name of "Tismo D".

The surface treated fibers A were obtained by treating Tismo D with 1% of bis(3-triethoxysilylpropyl)tetrasulfide.

The surface treated fibers B were obtained by treating Tismo D with 1% of γ-mercaptopropyltrimethoxysilane.

The surface treated fibers C were obtained by treating Tismo D with 1% of γ-mercaptopropyltriethoxysilane.

The surface treated fibers D were obtained by treating Tismo D with 1% of bis(3-trimethoxysilylpropyl)tetrasulfide.

The surface treated fibers E were obtained by treating Tismo D with 1% of γ-glycidoxypropyltrimethoxysilane.

The surface treated fibers F were obtained by treating Tismo D with 1% of bis(mercaptopropyl)tetramethylsiloxane.

The surface treated fibers G were obtained by treating Tismo D with 1% of bis(3-trimethoxysilylpropyl)disulfide.

The surface treated fibers H were obtained by treating silicon carbide whiskers produced by Tokai Carbon Co., Ltd. and marketed under a trade name of "Tokawhisker" with 1% of γ-mercaptopropylethoxysilane.

The surface treated fibers I were obtained by treating Tokawhisker with 1% of bis(3-trimethoxysilylpropyl)tetrasulfide.

The durability index of a given samples was determined by cyclically exerting a compression enough to produce a deformation of 10 mm on the sample and taking count of the number of compression cycles upto the rupture of the sample, and reported as a relative value based on the durability index of Example 1 taken as 100. The bounce impact elasticity was determined by allowing a given sample to fall from a height of 120 cm in an atmosphere kept at 20° C. and measuring the height to which the sample bounced according to the specification of JIS (Japan Industrial Standard) S 7005. The compression was evaluated as the strength exhibited by a given sample compressed 2.54 mm in diameter.

EXAMPLES 1 TO 18 AND COMPARATIVE EXPERIMENTS 1 TO 7

All of the ingredients, of which formulating ratios are indicated in Table 1 in parts by weight and each column corresponds to Each Example or Comparative Experiment (the same shall apply hereafter), excepting a vulcanizing agent were introduced in a kneader and kneaded for 10 minutes at 60° to 100° C., then the resultant mass was cooled to 60° C. to 70° C. and added with the vulcanizing agent to form a rubber composition of the present invention. The composition is kneaded and vulcanized in a test mold for 30 minutes at 150°±5° C. to form a test piece, which was subjected to measurements of the tensile strength and tear strength. The same procedure as described above was repeated for each Example and Comparative Experiment.

The results are also shown in Table 1.

EXAMPLES 19 TO 36 AND COMPARATIVE EXPERIMENTS 8 TO 14

Rubber compositions were produced by repeating the procedure of Examples 1 to 18 excepting that the formulating ratios indicated in Table 2 were used, and the properties of the obtained compositions were tested.

The results are also shown in Table 2.

EXAMPLES 37 TO 56 AND COMPARATIVE EXPERIMENTS 15 TO 21

All of the ingredients of which formulating ratios are indicated in Table 3 excepting the vulcanizing agent were introduced into a kneader and kneaded for 10 minutes at a temperature of 60° C. to 100° C., then cooled to a temperature of 60° C. to 70° C. and added with the vulcanizing agent. The density of the resultant mass was adjusted to form a golf ball of 45 g in weight and vulcanized in a conventional golf ball mold for 30 minutes at 150°±5° C. to produce a solid golf ball, of which bounce impact elasticity, durability, compression and feeling upon hitting were measured and tested. The same procedure as described above was repeated for each Example and Comparative Experiment.

The results are also shown in Table 3.

EXAMPLES 57 TO 63 AND COMPARATIVE EXPERIMENTS 22 TO 27

Solid golf balls were produced by repeating the procedure of Examples 37 to 56, excepting that the formulating ratios indicated in Table 4 were used, and the properties of the obtained ball were tested.

The results are also shown in Table 4.

EXAMPLES 64 TO 72 AND COMPARATIVE EXPERIMENTS 28 AND 29

Solid golf balls were produced by repeating the procedure of Examples 37 to 56, excepting that the formulating ratios indicated in Table 5 were used, and properties of the obtained balls were tested.

The results are also shown in Table 5.

EXAMPLES 73 TO 82 AND COMPARATIVE EXPERIMENTS 30 TO 33

Solid golf balls were produced by repeating the procedure of Examples 37 to 56, excepting that the formulating ratios indicated in Table 6 were used, and properties of the obtained balls were tested.

The results are also shown in Table 6.

EXAMPLES 83 TO 86 AND COMPARATIVE EXPERIMENTS 34 TO 39

All of the ingredients of which formulating ratios are indicated in Table 7 excepting the vulcanizing agent were introduced into a kneader and kneaded for 10 minutes at a temperature of 60° C. to 100° C., then cooled to a temperature of 60° C. to 70° C. and added with the vulcanizing agent. The resultant mass was vulcanized in a metal mold for golf ball core for 30 minutes at 150°±5° C. to produce a golf ball core. Thus obtained core was covered with a composition prepared by mixing 100 parts of ionomer resin and 10 parts f titanium oxide such that the ball weighed 45 g and injection molded by means of a injection molding machine to form a two-piece golf ball. The same procedure as described above was repeated for each Example and Comparative Experiment. The bounce impact elasticity, durability, compression and feeling upon hitting of the obtained golf balls were measured and tested.

The results are also shown in Table 7.

EXAMPLES 87 TO 90

Two-piece golf balls were produced by repeating the procedure of Examples 83 to 86, excepting that the formulating ratios of the cores indicated in Table 8 were used and that a hard elastomer obtained by mixing 100 parts of ionomer resin and potassium titanate fibers (surface treated fibers A) was used as the cover layer.

The properties of the obtained balls were tested, and the results are also shown in Table 8.

EXAMPLES 91 TO 96

Two-piece golf balls were produced by repeating the procedure of Examples 83 to 86, excepting that the formulating ratios of the cores indicated in Table 9 were used, and the properties of the obtained balls were tested.

The results are also shown in Table 9.

EXAMPLES 97 TO 100

Two-piece golf balls were produced by repeating the procedure of Examples 91 to 96, excepting that the formulating ratios of the cores indicated in Table 10 were used and that a hard elastomer obtained by mixing 100 parts of ionomer resin and potassium titanate fibers (surface treated fibers A) was used as the cover layer.

The the properties of the obtained balls were tested, and the results are also shown in Table 10.

EXAMPLES 101 TO 116

Two-piece golf balls were produced by covering the same golf ball cores as Example 92 with the covering compositions of which formulating ratios are shown in Table 11, and the properties of the obtained balls were tested.

The results are also shown in Table 11.

EXAMPLES 117 TO 127

Two-piece golf balls were produced by covering golf ball cores of which formulating ratios are shown in Table 12 with the same cover layers as Examples 103, 107 and 104, which were used for Examples 117 to 119, Examples 120 to 123 and Examples 124 to 127, respectively.

The properties of the obtained balls were tested and the results are also shown in Table 12.

EXAMPLES 128 TO 136 AND COMPARATIVE EXPERIMENTS 40 TO 41

Three-piece golf balls were produced by utilizing cores of which formulating ratios are shown in Table 13, and an intermediate layer and a cover layer of which formulating ratios are shown below.

The properties of the obtained balls were tested, and the results are also shown in Table 13.

|  | Examples | Comparative Experiments |
|---|---|---|
| Intermediate layer: | | |
| Rubber (BR) | 100 | 100 |
| Zinc acrylate | 15 | — |
| Zinc oxide | 10 | 15 |

-continued

|  | Examples | Comparative Experiments |
|---|---|---|
| Aerosolizable silica | 10 | 30 |
| Dicumyl peroxide | 5 | 5 |
| Antioxidant | 4 | 4 |
| Stearic acid | 2 | 2 |
| Surface treated fibers A | 20 | — |
| Cover layer: | | |
| Ionomer resin | 100 | |
| Titanium dioxide | 10 | |

EXAMPLES 137 TO 142 AND COMPARATIVE EXPERIMENTS 42 TO 47

Three-piece golf balls were produced by utilizing cores of which formulating ratios are shown in Table 14, and an intermediate layer and a cover layer of which formulating ratios are shown below.

The properties of the obtained balls were tested, and the results are also shown in Table 14.

|  | Examples | Comparative Experiments |
|---|---|---|
| Intermediate layer: | | |
| Rubber (BR) | 100 | 100 |
| Zinc acrylate | 15 | 10 |
| Zinc oxide | 10 | 15 |
| Aerosolizable silica | 10 | 40 |
| Dicumyl peroxide | 5 | 5 |
| Antioxidant | 4 | 5 |
| Stearic acid | 2 | 2 |
| Surface treated fibers A | 20 | — |
| Cover layer: | | |
| Ionomer resin | 100 | |
| Titanium dioxide | 10 | |

EXAMPLES 143 TO 146

Three-piece golf balls were produced by repeating the procedure of Examples 137 to 142 excepting that the formulating ratios of cores indicated in table 15 were used and that a hard elastomer prepared by mixing 100 parts of ionomer resin with 10 parts of the surface treated fibers A was used as the cover layer.

The properties of the obtained balls were tested, and the results are also shown in Table 15.

COMPARATIVE EXPERIMENTS 48 TO 51

Three-piece golf balls were produced by repeating the procedure of Comparative Experiments 42 to 47 excepting that the formulating ratios of cores indicated in Table 15 were used, and the properties of the obtained balls were tested.

The results are also shown in Table 15.

EXAMPLES 147 TO 150 AND COMPARATIVE EXPERIMENTS 52 TO 55

Three-piece golf balls were produced by repeating the procedure of Examples 143 to 146 and Comparative Experiments 48 to 51 excepting that the formulating ratios of cores indicated in Table 16 were used, and the properties of the obtained balls were tested.

The results are also shown in Table 16.

EXAMPLE 151 TO 161

Three-piece golf balls were produced by utilizing the same cores and intemediate layer as used in Example 138, and the cover layers of which formulating ratios are indicated in Table 17.

The properties of the obtained balls were tested and the results are also shown in Table 17.

EXAMPLES 162 TO 172

Three-piece golf balls were produced by utilizing cores of which formulating ratios are indicated in Table 18. The same cover layers as Examples 153, 157 and 154 were used for Examples 162 to 164, Examples 165 to 168 and Examples 169 to 172, respectively. The intermediate layers of the compositions A and B indicated below and the same intermediate layer as Example 128 were used for examples 162 to 164, Examples 165 to 167 and Examples 168 to 172, respectively.

The properties of the obtained balls were tested and the results are also shown in Table 18.

| Intermediate layers: | A | B |
|---|---|---|
| Rubber (BR) | 100 | 100 |
| Zinc acrylate | — | 20 |
| Calcium acrylate | 20 | — |
| Zinc oxide | 10 | 15 |
| Aerosolizable silica | — | 15 |
| Aerosolizable titanium dioxide | 10 | — |
| Dicumyl peroxide | 5 | 5 |
| Antioxidant | 4 | 4 |
| Stearic acid | 2 | 2 |
| Surface treated fibers A | 30 | — |
| Surface treated fibers B | — | 30 |

EXAMPLES 173 TO 178 AND COMPARATIVE EXPERIMENTS 56 TO 61

All of the ingredients indicated in Table 19 except for the vulcanizing agent were introduced into a kneader and kneaded at the temperature of 60° C. to 100° C. for 10 minutes. The contents of the kneader were cooled to 60° C. to 70° C., then added with the vulcanizing agent, adjusted in weight and further kneaded. The resultant mass was vulcanized in a conventional mold for a golf ball core at 150° C.±5° C. for 30 minutes to produce a spherical core. The core thus obtained was wound with an elastic thread, which was a NR-based rubber thread and also used in the following Examples. The resultant thread wound core was covered with a composition obtained by blending 100 parts of ionomer with 10 parts of titanium oxide and injection molded to produce a thread wound golf ball of 45 g in weight. The same procesure was repeated for each Example and Comparative Experiment.

The obtained golf balls were tested for bounce impact elasticity, durability, compression and feeling upon hitting, and the results are also shown in Table 19.

EXAMPLE 179 TO 182

Thread wound golf balls were produced by repeating the procedure of Examples 173 to 178 excepting that cover layers of hard elastomer obtained by blending 100 parts of ionomer resin with 10 parts of the surface treated fibers A and cores of which formulating ratios are indicated in Table 20 were used.

The properties of the obtained balls were tested, and the results are also shown in Table 20.

EXAMPLES 183 TO 188 AND COMPARATIVE EXPERIMENTS 62 TO 67

Thread wound golf balls were produced by repeating the precedure of Examples 173 to 178 excepting that cores of which formulating ratios are indicated in Table 21 were used, and the properties of the obtained balls were tested.

The results are also shown in Table 21.

EXAMPLE 189 TO 192

Thread wound golf balls were produced by repeating the procedure of Example 183 to 188 excepting that cores of which formulating ratios are indicated in Table 22 were used and that cover layers of hard elastomer obtained by blending 100 parts of ionomer resin with 10 parts of the surface treated fibers A were used.

The properties of the obtained balls were tested and the results are also shown in Table 22.

EXAMPLES 193 TO 203

Thread wound golf balls were produced by covering the same thread wound cores as Example 184 with cover layers of which formulating ratios are shown in Table 23.

The properties of the obtained balls were tested and the results are also shown in Table 23.

EXAMPLES 204 TO 214

Thread wound golf balls were produced by utilizing cores of which formulating ratios are indicated in Table 24. The same cover layers as Examples 195, 199 and 196 were used for Examples 204 to 206, Examples 207 to 210 and Examples 211 to 214, respectively.

The properties of the obtained balls were tested and the results are also shown in Table 24.

EXAMPLES 215 TO 224

In a kneader, 100 parts of rubber (BR *1), 10 parts of zinc acrylate, 15 parts of zinc oxide (*2) and 15 parts of potassium titanate fibers untreated) were blended at 60° C. to 100° C. for 10 minutes. Then, the contents of the kneader were cooled to 60° C. 70° C., mixed with 5 parts of dicumyl peroxide, adjusted in weight, and further kneaded. The resultant mass was vulcanized in a conventional mold for golf ball at 150° C.±5° C. for 30 minutes to produce a golf ball core. The resultant core was covered with a layer of which formulating ratio is indicated in Table 25 to form a two-piece golf ball. The same procedure was repeated for each Example.

The properties of the obtained balls were tested and the results ar also shown in Table 25.

EXAMPLE 225 TO 230

Two-piece golf balls were produced by repeating the procedure of Examples 215 to 224 excepting that cores of which formulating ratios are indicated in Table 26 were used and that a hard elastomer obtained by blending 100 parts of ionomer resin with 10 parts of the surface treated fibers A was used as the cover layers.

The properties of the obtained balls were tested and the results are also shown in Table 26.

COMPARATIVE EXPERIMENTS 68 TO 75

Two-piece golf balls were produced by repeating the procedure of Example 215 to 224 excepting that cover layers of which formulating ratios are indicated in Table 27 were used.

The properties of the obtained balls were tested and the results are shown in Table 27.

EXAMPLES 231 TO 240 AND COMPARATIVE EXPERIMENTS 76 TO 83

In a kneader, 100 parts of rubber (BR *1), 10 parts of zinc acrylate, 15 parts of zinc oxide (*2). 4 parts of an antioxidant, 2 parts of stearic acid and 15 parts of potassium titanate fibers (untreated) were kneaded at 60° C. to 100° C. for 10 minutes. Then, the contents of the kneader were cooled to 60° C. to 70° C., mixed with 5 parts of dicumyl peroxide, adjusted in weight and furter kneaded. The resultant mass was vulcanized in a conventional mold for golf ball core at 150° C.±5° C. for 30 minutes to form a golf ball core. Three-piece golf ball was produced by utilizing the above-obtained core, intermediate layer of the same composition as the core and cover layer of which formulating ratio is indicated in Table 28 or Table 29. The same procedure was repeated for each Example and Comparative Experiment.

The properties of the obtained balls were tested and the results are shown in Table 28 and Table 29.

EXAMPLES 241 TO 250 AND COMPARATIVE EXPERIMENTS 84 TO 91

In a kneader, 100 parts of rubber (BR *1), 10 parts of zinc acrylate, 15 parts of zinc oxide (*2), 10 parts of aerosolizable silica (*3) and 15 parts of potassium titanate fibers (untreated) were kneaded at 60° C. to 100° C. for 10 minutes. Then, the contents of the kneader were cooled to 60° C. to 70° C., mixed with 5 parts of dicumyl peroxide, adjusted in weight and further kneaded. The resultant mass was vulcanized in a conventional mold for golf ball core at 150° C.±5° C. for 30 minutes to form a golf ball core. The core was wound with the elastic thread, then covered with cover layer of which formulating ratio is indicated in Table 30 or Table 31 and injection molded by means of a injection machine to produce a thread wound golf ball of 45 g in weight. The same procedure was repeated for each Example and Comparative Experiment.

The properties of the obtained balls were tested and the results are shown in Table 30 and Table 31.

TABLE 1

|  | Examples | | | | Comparative Experiments | | | | | | |
| --- | --- | --- | --- | --- | --- | --- | --- | --- | --- | --- | --- |
|  | 1 | 2 | 3 | 4 | 1 | 2 | 3 | 4 | 5 | 6 | 7 |
| Rubber (BR) *1 | 100 | 100 | 100 | 100 | 100 | 100 | 100 | 100 | 100 | 100 | 100 |
| Zinc oxide *4 | 15 | 15 | 15 | 15 | 15 | 15 | 15 | 15 | 15 | 15 | 15 |
| Aerosolizable silica *5 | 20 | 20 | 20 | 20 | 50 | 30 | 20 | 20 | 20 | 20 | 20 |
| Dicumyl peroxide | 5 | 5 | 5 | 5 | 5 | 5 | 5 | 5 | 5 | 5 | — |
| Sulfur | — | — | — | — | — | — | — | — | — | — | 5 |
| Antioxidant | 4 | 4 | 4 | 4 | 4 | 4 | 4 | 4 | 4 | 4 | 4 |
| Stearic acid | 2 | 2 | 2 | 2 | 2 | 2 | 2 | 2 | 2 | 2 | 2 |
| Potassium titanate fibers (untreated) | — | — | — | — | — | — | 30 | 10 | — | — | — |
| Surface treated fibers |  |  |  |  |  |  |  |  |  |  |  |

TABLE 1-continued

| | | | | | | | | | | | |
|---|---|---|---|---|---|---|---|---|---|---|---|
| A | 30 | 10 | — | — | — | — | — | — | — | — | — |
| B | — | — | 30 | 10 | — | — | — | — | — | — | — |
| E | — | — | — | — | — | — | — | — | 30 | 10 | 30 |
| Tensile strength (kgf/cm$^2$) | 198 | 187 | 189 | 172 | 104 | 98 | 132 | 128 | 137 | 131 | 138 |
| Tear strength (kgf/cm$^2$) | 93 | 81 | 85 | 78 | 24 | 21 | 46 | 43 | 60 | 52 | 63 |

| | Examples | | | | | | | | | | | | | |
|---|---|---|---|---|---|---|---|---|---|---|---|---|---|---|
| | 5 | 6 | 7 | 8 | 9 | 10 | 11 | 12 | 13 | 14 | 15 | 16 | 17 | 18 |
| Rubber | | | | | | | | | | | | | | |
| BR *1 | — | 50 | — | — | 100 | 100 | 100 | 100 | 30 | 100 | 100 | 100 | 100 | 100 |
| SBR *2 | 100 | 50 | 50 | — | — | — | — | — | 70 | — | — | — | — | — |
| IR *3 | — | — | 50 | 100 | — | — | — | — | — | — | — | — | — | — |
| Zinc oxide *4 | 15 | 10 | 10 | 10 | 15 | 10 | 5 | 10 | 15 | 10 | 15 | 15 | 15 | 15 |
| Aerosolizable silica *5 | 25 | 20 | 10 | 10 | — | — | — | — | 10 | — | 10 | 10 | 10 | 10 |
| Aerosolizable titanium dioxide | — | — | — | — | 10 | 15 | 10 | 10 | — | 15 | — | — | — | — |
| Dicumyl peroxide | 5 | 5 | — | — | 5 | 5 | 5 | — | — | — | — | — | — | — |
| n-Butyl-bis(t-butyl-peroxy)valerate | — | — | 5 | 5 | — | — | — | 5 | 5 | 5 | 5 | 5 | 5 | 5 |
| Antioxidant | 4 | 4 | 4 | 4 | 4 | 4 | 4 | 4 | 4 | 4 | 4 | 4 | 4 | 4 |
| Stearic acid | 2 | 2 | 2 | 2 | 2 | 2 | 2 | 2 | 2 | 2 | 2 | 2 | 2 | 2 |
| Surface treated fibers | | | | | | | | | | | | | | |
| A | 20 | 20 | — | — | — | — | 5 | — | — | — | 20 | 25 | — | — |
| B | — | — | 25 | 25 | — | — | — | 5 | 10 | 10 | — | — | — | — |
| C | — | — | — | — | 20 | — | — | — | — | — | — | — | — | — |
| D | — | — | — | — | — | 30 | — | — | — | — | — | — | — | — |
| H | — | — | — | — | — | — | — | — | — | — | — | — | 20 | — |
| I | — | — | — | — | — | — | — | — | — | — | — | — | — | 20 |
| Tensile strength (kgf/cm$^2$) | 164 | 163 | 157 | 154 | 152 | 156 | 143 | 141 | 152 | 154 | 166 | 169 | 148 | 140 |
| Tear strength (kgf/cm$^2$) | 74 | 72 | 71 | 68 | 67 | 71 | 59 | 57 | 62 | 63 | 76 | 82 | 54 | 56 |

TABLE 2

| | Examples | | | | Comparative Experiments | | | | | | |
|---|---|---|---|---|---|---|---|---|---|---|---|
| | 19 | 20 | 21 | 22 | 8 | 9 | 10 | 11 | 12 | 13 | 14 |
| Rubber (BR) *1 | 100 | 100 | 100 | 100 | 100 | 100 | 100 | 100 | 100 | 100 | 100 |
| Zinc acrylate | 10 | 10 | 10 | 10 | 10 | 10 | 10 | 10 | 10 | 10 | 10 |
| Zinc oxide *4 | 10 | 10 | 10 | 10 | 10 | 10 | 10 | 10 | 10 | 10 | 10 |
| Aerosolizable silica *5 | 20 | 20 | 20 | 20 | 50 | 30 | 20 | 20 | 20 | 20 | 20 |
| Dicumyl peroxide | 3 | 3 | 3 | 3 | 3 | 3 | 3 | 3 | 3 | 3 | — |
| Sulfur | — | — | — | — | — | — | — | — | — | — | 3 |
| Antioxidant | 2 | 2 | 2 | 2 | 2 | 2 | 2 | 2 | 2 | 2 | 2 |
| Stearic acid | 2 | 2 | 2 | 2 | 2 | 2 | 2 | 2 | 2 | 2 | 2 |
| Potassium titanate fibers (untreated) | — | — | — | — | — | — | 30 | 10 | — | — | — |
| Surface treated fibers | | | | | | | | | | | |
| A | 30 | 10 | — | — | — | — | — | — | — | — | 30 |
| B | — | — | 30 | 10 | — | — | — | — | — | — | — |
| E | — | — | — | — | — | — | — | — | 30 | 10 | — |
| Tensile strength (kgf/cm$^2$) | 211 | 203 | 205 | 241 | 128 | 121 | 138 | 133 | 141 | 139 | 136 |
| Tear strength (kgf/cm$^2$) | 94 | 82 | 87 | 80 | 41 | 32 | 43 | 39 | 43 | 40 | 38 |

| | Examples | | | | | | | | | | | | | |
|---|---|---|---|---|---|---|---|---|---|---|---|---|---|---|
| | 23 | 24 | 25 | 26 | 27 | 28 | 29 | 30 | 31 | 32 | 33 | 34 | 35 | 36 |
| Rubber | | | | | | | | | | | | | | |
| BR *1 | — | 50 | — | — | 100 | 100 | 100 | 100 | 30 | 100 | 100 | 100 | 100 | 100 |
| SBR *2 | 100 | 50 | 50 | 100 | — | — | — | — | 70 | — | — | — | — | — |
| IR *3 | — | — | 50 | — | — | — | — | — | — | — | — | — | — | — |
| Acrylic acid | — | — | — | — | — | — | — | 5 | 10 | 15 | — | — | — | — |
| Zinc acrylate | 10 | — | — | — | 15 | 20 | 25 | — | — | — | 15 | 15 | 15 | 15 |
| Carcium methacrylate | — | 15 | 20 | 20 | — | — | — | — | — | — | — | — | — | — |
| Zinc oxide *4 | 15 | 10 | 10 | 10 | 15 | 10 | 5 | 10 | 15 | 10 | 15 | 15 | 15 | 15 |
| Aerosolizable silica *5 | 25 | 20 | 10 | 10 | — | — | — | — | 10 | — | 10 | 10 | 15 | 15 |
| Aerosolizable titanium dioxide | — | — | — | — | 10 | 15 | 10 | 10 | — | 15 | — | — | — | — |
| Dicumyl peroxide | 5 | 5 | — | — | 5 | 5 | 5 | — | — | — | — | — | — | — |
| n-butyl-bis(t-butyl-peroxy)valerate | — | — | 5 | 5 | — | — | — | 5 | 5 | 5 | 5 | 5 | 5 | 5 |
| Antioxidant | 4 | 4 | 4 | 4 | 4 | 4 | 4 | 4 | 4 | 4 | 4 | 4 | 4 | 4 |
| Stearic acid | 2 | 2 | 2 | 2 | 2 | 2 | 2 | 2 | 2 | 2 | 2 | 2 | 2 | 2 |
| Surface treated fibers | | | | | | | | | | | | | | |
| A | 20 | 20 | — | — | — | 30 | 5 | — | — | — | 20 | 25 | — | — |
| B | — | — | 25 | 25 | — | — | — | — | 10 | 10 | — | — | — | — |
| H | — | — | — | — | — | — | — | 5 | — | — | — | — | 20 | — |
| I | — | — | — | — | 20 | — | — | — | — | — | — | — | — | 20 |
| Tensile strength (kgf/cm$^2$) | 174 | 172 | 168 | 165 | 190 | 192 | 162 | 161 | 176 | 178 | 189 | 191 | 170 | 172 |
| Tear strength (kgf/cm$^2$) | 79 | 83 | 81 | 72 | 87 | 89 | 69 | 58 | 62 | 64 | 87 | 89 | 78 | 81 |

TABLE 3

|  | Examples | | | | Comparative Experiments | | | | | | |
|---|---|---|---|---|---|---|---|---|---|---|---|
|  | 37 | 38 | 39 | 40 | 15 | 16 | 17 | 18 | 19 | 20 | 21 |
| Rubber (BR) *1 | 100 | 100 | 100 | 100 | 100 | 100 | 100 | 100 | 100 | 100 | 100 |
| Zinc oxide *4 | 15 | 15 | 15 | 15 | 15 | 15 | 15 | 15 | 15 | 15 | 15 |
| Aerosolizable titanium dioxide | 10 | 10 | 10 | 10 | 50 | 30 | 20 | 20 | 20 | 20 | 20 |
| Dicumyl peroxide | — | — | — | — | 5 | 5 | 5 | 5 | 5 | 5 | — |
| n-Butyl-bis(t-butylperoxy) valerate | 5 | 5 | 5 | 5 | — | — | — | — | — | — | — |
| Sulfur | — | — | — | — | — | — | — | — | — | — | 5 |
| Antioxidant | 4 | 4 | 4 | 4 | 4 | 4 | 4 | 4 | 4 | 4 | 4 |
| Stearic acid | 2 | 2 | 2 | 2 | 2 | 2 | 2 | 2 | 2 | 2 | 2 |
| Potassium titanate fibers (untreated) | — | — | — | — | — | — | 30 | 10 | — | — | — |
| Surface treated fibers |  |  |  |  |  |  |  |  |  |  |  |
| A | 20 | 25 | — | — | — | — | — | — | — | — | — |
| C | — | — | 20 | — | — | — | — | — | — | — | — |
| D | — | — | — | 30 | — | — | — | — | — | — | — |
| E | — | — | — | — | — | — | — | — | 30 | 10 | 30 |
| Durability index | 100 | 100 | 101 | 101 | 30 | 34 | 38 | 37 | 39 | 37 | 34 |
| Bounce impact elasticity | 78 | 82 | 81 | 82 | 62 | 64 | 68 | 65 | 65 | 63 | 64 |
| Compression | 76 | 78 | 76 | 78 | 63 | 60 | 59 | 58 | 57 | 58 | 58 |
| Feeling upon hitting** | E | E | E | E | B | B | B | B | B | B | B |

|  | Examples | | | | | | | | | | | | | | | |
|---|---|---|---|---|---|---|---|---|---|---|---|---|---|---|---|---|
|  | 41 | 42 | 43 | 44 | 45 | 46 | 47 | 48 | 49 | 50 | 51 | 52 | 53 | 54 | 55 | 56 |
| Rubber |  |  |  |  |  |  |  |  |  |  |  |  |  |  |  |  |
| BR *1 | 100 | 100 | 100 | 100 | — | 50 | — | — | 100 | 100 | 100 | 100 | 30 | 100 | 100 | 100 |
| SBR *2 | — | — | — | — | 100 | 50 | 50 | 100 | — | — | — | — | 70 | — | — | — |
| IR *3 | — | — | — | — | — | — | 50 | — | — | — | — | — | — | — | — | — |
| Zinc oxide *4 | 15 | 15 | 15 | 15 | 15 | 10 | 10 | 10 | 15 | 10 | 5 | 10 | 15 | 10 | 15 | 15 |
| Aerosolizable silica *5 | 20 | 20 | 20 | 20 | 25 | 20 | 10 | 10 | — | — | — | — | 10 | — | — | — |
| Aerosolizable titanium dioxide | — | — | — | — | — | — | — | — | 10 | 15 | 10 | 10 | — | 15 | — | — |
| Dicumyl peroxide | 5 | 5 | 5 | 5 | 5 | 5 | — | — | 5 | 5 | 5 | — | — | — | 5 | 5 |
| n-Butyl-bis(t-butylperoxy) valerate | — | — | — | — | — | — | 5 | 5 | — | — | — | 5 | 5 | 5 | — | — |
| Antioxidant | 4 | 4 | 4 | 4 | 4 | 4 | 4 | 4 | 4 | 4 | 4 | 4 | 4 | 4 | 4 | 4 |
| Stearic acid | 2 | 2 | 2 | 2 | 2 | 2 | 2 | 2 | 2 | 2 | 2 | 2 | 2 | 2 | 2 | 2 |
| Surface treated fibers |  |  |  |  |  |  |  |  |  |  |  |  |  |  |  |  |
| A | 30 | 10 | — | — | 20 | 20 | — | — | — | 30 | 5 | — | — | — | — | — |
| B | — | — | 30 | 10 | — | — | 25 | 25 | — | — | — | — | 10 | 10 | — | — |
| D | — | — | — | — | — | — | — | — | 20 | — | — | 5 | — | — | — | — |
| F | — | — | — | — | — | — | — | — | — | — | — | — | — | — | 20 | — |
| G | — | — | — | — | — | — | — | — | — | — | — | — | — | — | — | 20 |
| Durability index | 106 | 102 | 104 | 100 | 101 | 102 | 100 | 49 | 50 | 50 | 49 | 50 | 50 | 50 | 122 | 120 |
| Bounce impact elasticity | 82 | 80 | 78 | 78 | 80 | 76 | 74 | 80 | 82 | 76 | 72 | 74 | 73 | 95 | 90 |  |
| Compression | 81 | 72 | 81 | 71 | 78 | 79 | 75 | 76 | 78 | 79 | 73 | 73 | 74 | 74 | 95 | 93 |
| Feeling upon hitting** | E | E | E | E | E | E | E | E | E | E | E | E | E | E | E | E |

**E: Excellent, B: Bad

TABLE 4

|  | Examples | | | | | | | Comparative Experiments | | | | | |
|---|---|---|---|---|---|---|---|---|---|---|---|---|---|
|  | 57 | 58 | 59 | 60 | 61 | 62 | 63 | 22 | 23 | 24 | 25 | 26 | 27 |
| Rubber |  |  |  |  |  |  |  |  |  |  |  |  |  |
| BR *1 | 100 | 80 | 60 | 40 | 20 | — | — | 100 | 100 | 100 | 40 | — | — |
| SBR *2 | — | 20 | 40 | 60 | 80 | 100 | — | — | — | — | 60 | — | — |
| IR *3 | — | — | — | — | — | — | 100 | — | — | — | — | 100 | 100 |
| Zinc acrylate | 8 | 8 | 8 | 8 | 10 | 10 | 10 | 8 | 8 | 8 | 10 | 10 | 10 |
| Zinc oxide *4 | 15 | 15 | 15 | 15 | 15 | 15 | 15 | 15 | 15 | 15 | 15 | 15 | 15 |
| Aerosolizable silica *5 | 20 | 20 | 20 | 20 | 20 | 20 | 20 | 50 | 20 | 20 | 20 | 20 | 20 |
| Dicumyl peroxide | 5 | 5 | 5 | 5 | 5 | 5 | 5 | 5 | 5 | 5 | 5 | 5 | 5 |
| Antioxidant | 4 | 4 | 4 | 4 | 4 | 4 | 4 | -4 | 4 | 4 | 4 | 4 | 4 |
| Stearic acid | 2 | 2 | 2 | 2 | 2 | 2 | 2 | 2 | 2 | 2 | 2 | 2 | 2 |
| Potassium titanate fibers (untreated) | — | — | — | — | — | — | — | — | 30 | — | 30 | 30 | 30 |
| Surface treated fibers |  |  |  |  |  |  |  |  |  |  |  |  |  |
| A | 30 | 30 | 30 | 30 | 30 | 30 | 30 | — | — | — | — | — | — |
| E | — | — | — | — | — | — | — | — | — | 30 | — | — | — |
| Durability index | 106 | 111 | 115 | 119 | 120 | 122 | 118 | 36 | 39 | 31 | 39 | 39 | 39 |
| Bounce impact elasticity | 98 | 93 | 91 | 90 | 86 | 84 | 89 | 72 | 80 | 65 | 62 | 63 | 63 |
| Compression | 97 | 95 | 94 | 93 | 93 | 96 | 93 | 81 | 81 | 57 | 59 | 60 | 60 |
| Feeling upon hitting** | E | E | E | E | E | E | E | B | B | B | B | B | B |

**E: Excellent, B: Bad

TABLE 5

|  | Examples | | | | | | | | | Comparative Experiments | |
|---|---|---|---|---|---|---|---|---|---|---|---|
|  | 64 | 65 | 66 | 67 | 68 | 69 | 70 | 71 | 72 | 28 | 29 |
| Rubber (BR) *1 | 100 | 100 | 100 | 100 | 100 | 100 | 100 | 100 | 100 | 100 | 100 |
| Zinc acrylate | 1 | 10 | 15 | 20 | 25 | 30 | 50 | 8 | 8 | — | 100 |
| Zinc oxide *4 | 10 | 10 | 10 | 10 | 10 | 10 | 10 | 15 | 15 | 10 | 10 |
| Aerosolizable silica *5 | 15 | 15 | 15 | 15 | 15 | 15 | 15 | — | — | 15 | 15 |
| Dicumyl peroxide | 5 | 5 | 5 | 5 | 5 | 5 | 5 | 5 | 5 | 5 | 5 |
| Antioxidant | 4 | 4 | 4 | 4 | 4 | 4 | 4 | 4 | 4 | 4 | 4 |
| Stearic acid | 2 | 2 | 2 | 2 | 2 | 2 | 2 | 2 | 2 | 2 | 2 |
| Surface treated fibers | | | | | | | | | | | |
| A | 20 | 20 | 20 | 20 | 20 | 20 | 20 | — | — | 20 | 20 |
| F | — | — | — | — | — | — | — | 20 | — | — | — |
| G | — | — | — | — | — | — | — | — | 20 | — | — |
| Durability index | 102 | 105 | 103 | 104 | 101 | 99 | 94 | 123 | 124 | 38 | 37 |
| Bounce impact elasticity | 95 | 96 | 95 | 92 | 89 | 87 | 86 | 93 | 91 | 81 | 67 |
| Compression | 88 | 90 | 91 | 93 | 96 | 101 | 112 | 93 | 94 | 80 | 57 |
| Feeling upon hitting** | E | E | E | E | E | E | E | E | E | E | B |

**E: Excellent. B: Bad

TABLE 6

|  | Examples | | | | | | | | | | Comparative Experiments | | | |
|---|---|---|---|---|---|---|---|---|---|---|---|---|---|---|
|  | 73 | 74 | 75 | 76 | 77 | 78 | 79 | 80 | 81 | 82 | 30 | 31 | 32 | 33 |
| Rubber | | | | | | | | | | | | | | |
| BR *1 | 100 | 50 | — | — | 100 | 100 | 100 | 100 | 30 | 100 | 100 | 100 | — | — |
| SBR *2 | — | 50 | 50 | 100 | — | — | — | — | 70 | — | — | — | 100 | 100 |
| IR *3 | — | — | 50 | — | — | — | — | — | — | — | — | — | — | — |
| Acrylic acid | — | — | — | — | — | — | — | 5 | 10 | 15 | — | — | — | — |
| Zinc acrylate | 10 | — | — | — | 15 | 20 | 25 | — | — | — | 10 | — | — | 10 |
| Carcium methacrylate | — | 15 | 20 | 20 | — | — | — | — | — | — | — | — | — | — |
| Zinc oxide *4 | 15 | 10 | 10 | 10 | 15 | 10 | 5 | 10 | 15 | 10 | 15 | 15 | 15 | 15 |
| Aerosolizable silica *5 | 25 | 20 | 10 | 10 | — | — | — | — | 10 | — | — | — | — | — |
| Aerosolizable titanium dioxide | — | — | — | — | 10 | 15 | 10 | 10 | — | 15 | 25 | 40 | 30 | 25 |
| Dicumyl peroxide | 5 | 5 | — | — | 5 | 5 | 5 | — | — | — | — | — | — | — |
| n-Butyl-bis(t-butyl-peroxy)valerate | — | — | 5 | 5 | — | — | — | 5 | 5 | 5 | 5 | 5 | 5 | 5 |
| Antioxidant | 4 | 4 | 4 | 4 | 4 | 4 | 4 | 4 | 4 | 4 | 4 | 4 | 4 | 4 |
| Stearic acid | 2 | 2 | 2 | 2 | 2 | 2 | 2 | 2 | 2 | 2 | 2 | 2 | 2 | 2 |
| Potassium titanate fibers (untreated) | — | — | — | — | — | — | — | — | — | — | 20 | — | — | 20 |
| Surface treated fibers | | | | | | | | | | | | | | |
| A | 20 | 20 | — | — | 20 | 30 | 5 | — | — | — | — | — | — | — |
| B | — | — | 25 | 25 | — | — | — | 5 | — | — | — | — | — | — |
| C | — | — | — | — | — | — | — | — | 10 | — | — | — | — | — |
| D | — | — | — | — | — | — | — | — | — | 10 | — | — | — | — |
| Durability index | 103 | 111 | 112 | 120 | 123 | 127 | 110 | 97 | 97 | 98 | 39 | 38 | 41 | 37 |
| Bounce impact elasticity | 95 | 93 | 90 | 88 | 94 | 94 | 87 | 89 | 90 | 88 | 81 | 80 | 78 | 72 |
| Compression | 96 | 95 | 94 | 91 | 93 | 92 | 86 | 88 | 92 | 86 | 79 | 81 | 78 | 71 |
| Feeling upon hitting** | E | E | E | E | E | E | E | E | E | E | B | B | B | B |

**E: Excellent. B: Bad

TABLE 7

Formulating Ratios of Cores

|  | Examples | | | | Comparative Experiments | | | | | |
|---|---|---|---|---|---|---|---|---|---|---|
|  | 83 | 84 | 85 | 86 | 34 | 35 | 36 | 37 | 38 | 39 |
| Rubber (BR) *1 | 100 | 100 | 100 | 100 | 100 | 100 | 100 | 100 | 100 | 100 |
| Zinc oxide *4 | 15 | 15 | 15 | 15 | 15 | 15 | 15 | 15 | 15 | 15 |
| Aerosolizable silica *5 | 10 | 10 | 10 | 10 | 10 | 10 | 10 | 10 | 10 | 30 |
| Dicumyl peroxide | 5 | 5 | 5 | 5 | 5 | 5 | 5 | 5 | 5 | 5 |
| Antioxidant | 4 | 4 | 4 | 4 | 4 | 4 | 4 | 4 | 4 | 4 |
| Stearic acid | 2 | 2 | 2 | 2 | 2 | 2 | 2 | 2 | 2 | 2 |
| Potassium titanate fibers (untreated) | — | — | — | — | 10 | 15 | 20 | 25 | — | — |
| Surface treated fibers | | | | | | | | | | |
| A | 10 | 15 | 20 | 25 | — | — | — | — | — | — |
| E | — | — | — | — | — | — | — | — | 20 | — |
| Durability index | 110 | 125 | 129 | 134 | 46 | 47 | 47 | 48 | 47 | 45 |
| Bounce impact elasticity | 99 | 101 | 101 | 103 | 86 | 87 | 87 | 86 | 91 | 84 |
| Compression | 107 | 109 | 112 | 116 | 93 | 94 | 93 | 95 | 92 | 89 |
| Feeling upon hitting** | E | E | E | E | B | B | B | B | B | B |

**E: Excellent. B: Bad

TABLE 8

Formulating Ratios of Cores

| | Examples | | | |
|---|---|---|---|---|
| | 87 | 88 | 89 | 90 |
| Rubber (BR) *1 | 100 | 100 | 100 | 100 |
| Zinc oxide *4 | 15 | 15 | 15 | 15 |
| Aerosolizable silica *5 | 10 | 10 | 10 | 10 |
| Dicumyl peroxide | 5 | 5 | 5 | 5 |
| Antioxidant | 4 | 4 | 4 | 4 |
| Stearic acid | 2 | 2 | 2 | 2 |
| Surface treated fibers A | 10 | 15 | 20 | 25 |
| Durability index | 118 | 131 | 134 | 138 |
| Bounce impact elasticity | 101 | 103 | 103 | 106 |
| Compression | 108 | 111 | 111 | 119 |
| Feeling upon hitting** | E | E | E | E |

**E: Excellent

TABLE 9

Formulating Ratios of Cores

| | Examples | | | | | |
|---|---|---|---|---|---|---|
| | 91 | 92 | 93 | 94 | 95 | 96 |
| Rubber (BR) *1 | 100 | 100 | 100 | 100 | 100 | 100 |
| Zinc acrylate | 10 | 10 | 10 | 10 | 10 | 8 |
| Zinc oxide *4 | 15 | 15 | 15 | 15 | 10 | 10 |
| Aerosolizable silica *5 | 10 | 10 | 10 | 10 | — | — |
| Dicumyl peroxide | 5 | 5 | 5 | 5 | 5 | — |
| n-Butyl-bis(t-butylperoxy)-valerate | — | — | — | — | — | 5 |
| Antioxidant | 4 | 4 | 4 | 4 | 4 | 4 |
| Stearic acid | 2 | 2 | 2 | 2 | 2 | 2 |
| Surface treated fibers | | | | | | |

TABLE 9-continued

Formulating Ratios of Cores

| | Examples | | | | | |
|---|---|---|---|---|---|---|
| | 91 | 92 | 93 | 94 | 95 | 96 |
| A | 10 | 15 | 20 | 25 | — | — |
| F | — | — | — | — | 30 | — |
| G | — | — | — | — | — | 30 |
| Durability index | 122 | 138 | 142 | 146 | 136 | 133 |
| Bounce impact elasticity | 105 | 106 | 106 | 107 | 105 | 104 |
| Compression | 120 | 121 | 123 | 123 | 123 | 121 |
| Feeling upon hitting** | E | E | E | E | E | E |

**E: Excellent

TABLE 10

Formulating Ratios of Cores

| | Examples | | | |
|---|---|---|---|---|
| | 97 | 98 | 99 | 100 |
| Rubber (BR) *1 | 100 | 100 | 100 | 100 |
| Zinc acrylate | 10 | 10 | 10 | 10 |
| Zinc oxide *4 | 15 | 15 | 15 | 15 |
| Aerosolizable silica *5 | 10 | 10 | 10 | 10 |
| Dicumyl peroxide | 5 | 5 | 5 | 5 |
| Antioxidant | 4 | 4 | 4 | 4 |
| Stearic acid | 2 | 2 | 2 | 2 |
| Surface treated fibers A | 10 | 15 | 20 | 25 |
| Durability index | 127 | 142 | 148 | 151 |
| Bounce impact elasticity | 106 | 108 | 108 | 109 |
| Compression | 122 | 123 | 124 | 126 |
| Feeling upon hitting** | E | E | E | E |

**E: Excellent

TABLE 11

Formulating Ratios of Cover Layers

| | Examples | | | | | | | | | | | | | | | |
|---|---|---|---|---|---|---|---|---|---|---|---|---|---|---|---|---|
| | 101 | 102 | 103 | 104 | 105 | 106 | 107 | 108 | 109 | 110 | 111 | 112 | 113 | 114 | 115 | 116 |
| Ionomer resin | 100 | 100 | 100 | 100 | 100 | — | — | — | — | — | — | — | — | — | — | — |
| Trans-polyisoprene resin | — | — | — | — | — | 100 | 100 | 100 | 100 | — | — | — | — | — | — | — |
| Rubber (BR) *1 | — | — | — | — | — | — | — | — | — | 100 | 100 | 100 | 100 | 100 | 100 | 100 |
| Zinc oxide *4 | — | — | — | — | — | — | — | — | — | 10 | 10 | 10 | 10 | 10 | 10 | 10 |
| Sulfur | — | — | — | — | — | 1 | 1 | 1 | 1 | — | — | — | — | — | — | — |
| Vulcanization accelerator | — | — | — | — | — | 15 | 15 | 15 | 15 | — | — | — | — | — | — | — |
| Zinc acrylate | — | — | — | — | — | — | — | — | — | — | 9 | 9 | 9 | 8 | 8 | 8 |
| Carcium methacrylate | — | — | — | — | — | — | — | — | — | 8 | — | — | — | — | — | — |
| Dicumyl peroxide | — | — | — | — | — | — | — | — | — | 5 | 5 | 5 | 5 | 5 | 5 | 5 |
| Antioxidant | — | — | — | — | — | — | — | — | — | 4 | 4 | 4 | 4 | 4 | 4 | 4 |
| Stearic acid | — | — | — | — | — | — | — | — | — | 2 | 2 | 2 | 2 | 2 | 2 | 2 |
| Titanium dioxide | 20 | — | — | — | — | — | — | — | — | — | — | — | — | — | — | — |
| Potassium titanate fibers (untreated) | — | 20 | — | — | — | — | — | — | — | — | — | — | — | — | — | — |
| Surface treated fibers | | | | | | | | | | | | | | | | |
| A | — | — | 20 | — | — | — | — | — | — | 20 | — | — | — | — | — | — |
| B | — | — | — | 30 | — | 10 | — | — | — | — | 20 | — | — | — | — | — |
| C | — | — | — | — | — | — | 20 | — | — | — | — | 30 | — | — | — | — |
| D | — | — | — | — | — | — | — | 30 | — | — | — | — | 20 | — | — | — |
| E | — | — | — | — | 20 | — | — | — | 20 | — | — | — | — | 20 | — | — |
| F | — | — | — | — | — | — | — | — | — | — | — | — | — | — | 30 | — |
| G | — | — | — | — | — | — | — | — | — | — | — | — | — | — | — | 20 |
| Durability index | 140 | 142 | 150 | 148 | 128 | 114 | 118 | 126 | 112 | 136 | 132 | 131 | 128 | 129 | 130 | 131 |
| Bounce impact elasticity | 105 | 108 | 108 | 108 | 106 | 99 | 101 | 101 | 102 | 108 | 107 | 104 | 103 | 106 | 107 | 105 |
| Compression | 122 | 123 | 124 | 124 | 122 | 107 | 106 | 107 | 109 | 122 | 124 | 121 | 122 | 126 | 127 | 121 |
| Feeling upon hitting** | E | E | E | E | E | E | E | E | E | E | E | E | E | E | E | E |

**E: Excellent

TABLE 12

| | Examples | | | | | | | | | | |
|---|---|---|---|---|---|---|---|---|---|---|---|
| | 117 | 118 | 119 | 120 | 121 | 122 | 123 | 124 | 125 | 126 | 127 |
| Rubber | | | | | | | | | | | |
| BR *1 | 100 | 100 | 30 | — | — | 10 | 100 | 50 | 10 | 20 | — |
| SBR *2 | — | — | 70 | 100 | — | 90 | — | 50 | 90 | 80 | 50 |
| IR *3 | — | — | — | — | 100 | — | — | — | — | — | 50 |
| Acrylic acid | — | — | — | 20 | — | — | — | — | — | — | — |
| Zinc acrylate | 20 | 25 | 10 | — | — | 10 | — | — | — | — | — |
| Carcium methacrylate | — | — | — | — | 25 | — | — | — | — | — | — |

TABLE 12-continued

| | Examples | | | | | | | | | | |
|---|---|---|---|---|---|---|---|---|---|---|---|
| | 117 | 118 | 119 | 120 | 121 | 122 | 123 | 124 | 125 | 126 | 127 |
| Zinc oxide *4 | 10 | 5 | 15 | 10 | 5 | 15 | 15 | 15 | 15 | 15 | 20 |
| Aerosolizable silica *5 | — | — | 10 | 15 | 10 | 10 | 10 | — | — | — | — |
| Aerosolizable titanium dioxide | 15 | 10 | — | — | — | — | — | 10 | 10 | 10 | 15 |
| Dicumyl peroxide | 5 | 5 | — | 5 | 5 | 5 | — | 5 | 5 | 5 | 5 |
| n-Butyl-bis(t-butyl-peroxy)valerate | — | — | 5 | — | — | — | 5 | — | — | — | — |
| Antioxidant | 4 | 4 | 4 | 4 | 4 | 4 | 4 | 4 | 4 | 4 | 4 |
| Stearic acid | 2 | 2 | 2 | 2 | 2 | 2 | 2 | 2 | 2 | 2 | 2 |
| Surface treated fibers | | | | | | | | | | | |
| A | 30 | — | — | — | — | 25 | — | — | 20 | — | 20 |
| B | — | 5 | — | — | 15 | — | 20 | — | — | 20 | — |
| C | — | — | 10 | — | — | — | — | 25 | — | — | — |
| D | — | — | — | 15 | — | — | — | — | — | — | — |
| Durability index | 158 | 142 | 144 | 121 | 128 | 136 | 132 | 148 | 149 | 148 | 149 |
| Bounce impact elasticity | 108 | 102 | 101 | 94 | 90 | 96 | 102 | 101 | 102 | 100 | 103 |
| Compression | 128 | 109 | 106 | 102 | 101 | 103 | 106 | 118 | 121 | 121 | 122 |
| Feeling upon hitting** | E | E | E | E | E | E | E | E | E | E | E |

**E: Excellent

TABLE 13

Formulating Ratios of Cores

| | Examples | | | | | | | | | Comparative Experiments | |
|---|---|---|---|---|---|---|---|---|---|---|---|
| | 128 | 129 | 130 | 131 | 132 | 133 | 134 | 135 | 136 | 40 | 41 |
| Rubber (BR) *1 | 100 | 100 | 100 | 100 | 100 | 100 | 100 | 100 | 100 | 100 | 100 |
| Zinc oxide *4 | 15 | 15 | 15 | 15 | 15 | 15 | 15 | 15 | 15 | 15 | 15 |
| Aerosolizable silica *5 | 10 | 10 | 10 | 10 | 10 | 10 | 10 | 10 | 30 | 15 | 15 |
| Dicumyl peroxide | 5 | 5 | 5 | 5 | 5 | 5 | 5 | 5 | 5 | 5 | 5 |
| Antioxidant | 4 | 4 | 4 | 4 | 4 | 4 | 4 | 4 | 4 | 4 | 4 |
| Stearic acid | 2 | 2 | 2 | 2 | 2 | 2 | 2 | 2 | 2 | 2 | 2 |
| Potassium titanate fibers (untreated) | — | — | — | — | 10 | 15 | 20 | — | — | 20 | — |
| Surface treated fibers | | | | | | | | | | | |
| A | 10 | 15 | 20 | 25 | — | — | — | — | — | — | — |
| E | — | — | — | — | — | — | — | 20 | — | — | 20 |
| Durability index | 110 | 123 | 128 | 132 | 91 | 93 | 95 | 90 | 88 | 48 | 49 |
| Bounce impact elasticity | 102 | 103 | 103 | 104 | 104 | 104 | 104 | 103 | 99 | 97 | 98 |
| Compression | 107 | 108 | 109 | 109 | 101 | 102 | 102 | 98 | 99 | 88 | 90 |
| Feeling upon hitting** | E | E | E | E | E | E | E | E | E | B | B |

**E: Excellent. B: Bad

TABLE 14

Formulating Ratios of Cores

| | Examples | | | | | | Comparative Experiments | | | | | |
|---|---|---|---|---|---|---|---|---|---|---|---|---|
| | 137 | 138 | 139 | 140 | 141 | 142 | 42 | 43 | 44 | 45 | 46 | 47 |
| Rubber (BR) *1 | 100 | 100 | 100 | 100 | 100 | 100 | 100 | 100 | 100 | 100 | 100 | 100 |
| Acrylic acid | — | — | — | — | 8 | 8 | — | — | — | — | — | — |
| Zinc acrylate | 10 | 10 | 10 | 10 | — | — | 10 | 10 | 10 | 10 | 10 | 10 |
| Zinc oxide *4 | 15 | 15 | 15 | 15 | 10 | 10 | 15 | 15 | 15 | 15 | 15 | 15 |
| Aerosolizable silica *5 | 10 | 10 | 10 | 10 | — | — | 10 | 10 | 10 | 10 | 10 | 30 |
| Dicumyl peroxide | 5 | 5 | 5 | 5 | — | — | 5 | 5 | 5 | 5 | 5 | 5 |
| n-Butyl-bis(t-butyl-peroxy)valerate | — | — | — | — | 5 | 5 | — | — | — | — | — | — |
| Antioxidant | 4 | 4 | 4 | 4 | 4 | 4 | 4 | 4 | 4 | 4 | 4 | 4 |
| Stearic acid | 2 | 2 | 2 | 2 | 2 | 2 | 2 | 2 | 2 | 2 | 2 | 2 |
| Potassium titanate fibers (untreated) | — | — | — | — | — | — | 10 | 15 | 20 | 25 | — | — |
| Surface treated fibers | | | | | | | | | | | | |
| A | 10 | 15 | 20 | 25 | — | — | — | — | — | — | — | — |
| E | — | — | — | — | — | — | — | — | — | — | 20 | — |
| F | — | — | — | — | 30 | — | — | — | — | — | — | — |
| G | — | — | — | — | — | 30 | — | — | — | — | — | — |
| Durability index | 123 | 140 | 144 | 148 | 136 | 133 | 52 | 52 | 52 | 53 | 52 | 49 |
| Bounce impact elasticity | 105 | 107 | 107 | 108 | 104 | 103 | 92 | 92 | 93 | 94 | 92 | 86 |
| Compression | 121 | 123 | 125 | 125 | 111 | 115 | 110 | 113 | 113 | 114 | 108 | 106 |
| Feeling upon hitting** | E | E | E | E | E | E | B | B | B | B | B | B |

**E: Excellent. B: Bad

TABLE 15

Formulating Ratios of Cores

| | Examples | | | | Comparative Experiments | | | |
|---|---|---|---|---|---|---|---|---|
| | 143 | 144 | 145 | 146 | 48 | 49 | 50 | 51 |
| Rubber (BR) *1 | 100 | 100 | 100 | 100 | 100 | 100 | 100 | 100 |
| Zinc acrylate | 10 | 10 | 10 | 10 | 10 | 10 | 10 | 10 |
| Zinc oxide *4 | 15 | 15 | 15 | 15 | 15 | 15 | 15 | 15 |
| Aerosolizable silica *5 | 10 | 10 | 10 | 10 | 20 | 25 | 30 | 35 |
| Dicumyl peroxide | 5 | 5 | 5 | 5 | 5 | 5 | 5 | 5 |
| Antioxidant | 4 | 4 | 4 | 4 | 4 | 4 | 4 | 4 |
| Stearic acid | 2 | 2 | 2 | 2 | 2 | 2 | 2 | 2 |
| Surface treated fibers A | 10 | 15 | 20 | 25 | — | — | — | — |
| Durability index | 124 | 134 | 141 | 145 | 50 | 50 | 50 | 51 |
| Bounce impact elasticity | 103 | 104 | 105 | 105 | 82 | 83 | 82 | 82 |
| Compression | 109 | 110 | 111 | 112 | 110 | 112 | 111 | 112 |
| Feeling upon hitting** | E | E | E | E | B | B | B | B |

**E: Excellent, B: Bad

TABLE 16

Formulating Ratios of Cores

| | Examples | | | | Comparative Experiments | | | |
|---|---|---|---|---|---|---|---|---|
| | 147 | 148 | 149 | 150 | 52 | 53 | 54 | 55 |
| Rubber (BR) *1 | 100 | 100 | 100 | 100 | 100 | 100 | 100 | 100 |
| Zinc oxide *4 | 15 | 15 | 15 | 15 | 15 | 15 | 15 | 15 |
| Aerosolizable silica *5 | 10 | 10 | 10 | 10 | 20 | 25 | 30 | 35 |
| Dicumyl peroxide | 5 | 5 | 5 | 5 | 5 | 5 | 5 | 5 |
| Antioxidant | 4 | 4 | 4 | 4 | 4 | 4 | 4 | 4 |
| Stearic acid | 2 | 2 | 2 | 2 | 2 | 2 | 2 | 2 |
| Surface treated fibers A | 10 | 15 | 20 | 25 | — | — | — | — |
| Durability index | 117 | 130 | 134 | 138 | 51 | 51 | 51 | 52 |
| Bounce impact elasticity | 103 | 103 | 104 | 105 | 85 | 86 | 85 | 86 |
| Compression | 108 | 109 | 110 | 110 | 111 | 109 | 112 | 112 |
| Feeling upon hitting** | E | E | E | E | B | B | B | B |

**E: Excellent, B: Bad

TABLE 17

Formulating Ratios of Cover Layers

| | Examples | | | | | | | | | | |
|---|---|---|---|---|---|---|---|---|---|---|---|
| | 151 | 152 | 153 | 154 | 155 | 156 | 157 | 158 | 159 | 160 | 161 |
| Ionomer resin | 100 | 100 | 100 | 100 | 100 | — | — | — | — | — | — |
| Trans-polyisoprene resin | — | — | — | — | — | 100 | 100 | 100 | 100 | — | — |
| Rubber (BR) *1 | — | — | — | — | — | — | — | — | — | 100 | 100 |
| Zinc oxide *4 | — | — | — | — | — | — | — | — | — | 10 | 10 |
| Zinc acrylate | — | — | — | — | — | — | — | — | — | 10 | — |
| Sulfur | — | — | — | — | — | 1 | 1 | 1 | 1 | — | — |
| Vulcanization accelerator | — | — | — | — | — | 15 | 15 | 15 | 15 | — | — |
| Titanium dioxide | 20 | — | — | — | — | — | — | — | — | — | — |
| Dicumyl peroxide | — | — | — | — | — | — | — | — | — | 5 | 5 |
| Antioxidant | — | — | — | — | — | — | — | — | — | 4 | 5 |
| Stearic acid | — | — | — | — | — | — | — | — | — | 2 | 2 |
| Potassium titanate fibers (untreated) | — | 20 | — | — | — | — | — | — | — | — | — |
| Surface treated fibers | | | | | | | | | | | |
| A | — | — | 20 | — | — | — | — | — | — | — | — |
| B | — | — | — | 30 | — | 10 | — | — | — | — | — |
| C | — | — | — | — | — | — | 20 | — | — | 20 | — |
| D | — | — | — | — | — | — | — | 30 | — | — | 30 |
| E | — | — | — | — | 20 | — | — | — | 20 | — | — |
| Durability index | 138 | 142 | 151 | 149 | 129 | 121 | 123 | 128 | 112 | 121 | 122 |
| Bounce impact elasticity | 106 | 109 | 110 | 107 | 104 | 107 | 108 | 108 | 103 | 108 | 108 |
| Compression | 122 | 122 | 124 | 125 | 122 | 107 | 106 | 107 | 106 | 121 | 122 |
| Feeling upon hitting** | E | E | E | E | E | E | E | E | E | E | E |

**E: Excellent

TABLE 18

| | Examples | | | | | | | | | | |
|---|---|---|---|---|---|---|---|---|---|---|---|
| | 162 | 163 | 164 | 165 | 166 | 167 | 168 | 169 | 170 | 171 | 172 |
| Rubber | | | | | | | | | | | |
| BR *1 | 100 | 100 | 30 | — | — | 10 | 100 | 50 | 10 | 20 | — |
| SBR *2 | — | — | 70 | 100 | — | 90 | — | 50 | 90 | 80 | 50 |
| IR *3 | — | — | — | — | 100 | — | — | — | — | — | 50 |

TABLE 18-continued

| | Examples | | | | | | | | | | |
|---|---|---|---|---|---|---|---|---|---|---|---|
| | 162 | 163 | 164 | 165 | 166 | 167 | 168 | 169 | 170 | 171 | 172 |
| Acrylic acid | — | — | — | 20 | — | — | — | — | — | — | — |
| Zinc acrylate | 20 | 25 | 10 | — | — | 10 | — | — | — | — | — |
| Carcium methacrylate | — | — | — | — | 25 | — | — | — | — | — | — |
| Zinc oxide *4 | 10 | 5 | 15 | 10 | 5 | 15 | 15 | 15 | 15 | 15 | 20 |
| Aerosolizable silica *5 | — | — | 10 | 15 | 10 | 10 | 10 | — | — | — | — |
| Aerosolizable titanium dioxide | 15 | 10 | — | — | — | — | — | 10 | 10 | 10 | 15 |
| Dicumyl peroxide | 5 | 5 | — | 5 | 5 | 5 | — | 5 | 5 | 5 | 5 |
| n-Butyl-bis(t-butyl-peroxy)valerate | — | — | 5 | — | — | — | 5 | — | — | — | — |
| Antioxidant | 4 | 4 | 4 | 4 | 4 | 4 | 4 | 4 | 4 | 4 | 4 |
| Stearic acid | 2 | 2 | 2 | 2 | 2 | 2 | 2 | 2 | 2 | 2 | 2 |
| Surface treated fibers | | | | | | | | | | | |
| A | 15 | — | — | — | — | 25 | — | — | 20 | — | 20 |
| B | — | 5 | — | — | 15 | — | 20 | — | — | 20 | — |
| C | — | — | 10 | — | — | — | — | 25 | — | — | — |
| D | — | — | — | 15 | — | — | — | — | — | — | — |
| Durability index | 157 | 144 | 146 | 122 | 127 | 134 | 130 | 147 | 150 | 150 | 148 |
| Bounce impact elasticity | 108 | 103 | 102 | 96 | 98 | 106 | 102 | 102 | 109 | 110 | 109 |
| Compression | 127 | 107 | 109 | 107 | 109 | 104 | 110 | 117 | 120 | 120 | 121 |
| Feeling upon hitting** | E | E | E | E | E | E | E | E | E | E | E |

**E: Excellent

TABLE 19

Formulating Ratios of Spherical Cores

| | Examples | | | | | | Comparative Experiments | | | | | |
|---|---|---|---|---|---|---|---|---|---|---|---|---|
| | 173 | 174 | 175 | 176 | 177 | 178 | 56 | 57 | 58 | 59 | 60 | 61 |
| Rubber (BR) *1 | 100 | 100 | 100 | 100 | 100 | 100 | 100 | 100 | 100 | 100 | 100 | 100 |
| Zinc oxide *4 | 15 | 15 | 15 | 15 | 15 | 15 | 15 | 15 | 15 | 15 | 15 | 15 |
| Aerosolizable silica *5 | 10 | 10 | 10 | 10 | — | — | 10 | 10 | 10 | 10 | 10 | 30 |
| Dicumyl peroxide | 5 | 5 | 5 | 5 | 5 | 5 | 5 | 5 | 5 | 5 | 5 | 5 |
| Antioxidant | 4 | 4 | 4 | 4 | 4 | 4 | 4 | 4 | 4 | 4 | 4 | 4 |
| Stearic acid | 2 | 2 | 2 | 2 | 2 | 2 | 2 | 2 | 2 | 2 | 2 | 2 |
| Potassium titanate fibers (untreated) | — | — | — | — | — | — | 10 | 15 | 20 | 25 | — | — |
| Surface treated fibers | | | | | | | | | | | | |
| A | 10 | 15 | 20 | 25 | — | — | — | — | — | — | — | — |
| E | — | — | — | — | — | — | — | — | — | — | 20 | — |
| F | — | — | — | — | 20 | — | — | — | — | — | — | — |
| G | — | — | — | — | — | 20 | — | — | — | — | — | — |
| Durability index | 105 | 118 | 119 | 121 | 123 | 124 | 50 | 50 | 51 | 51 | 49 | 48 |
| Bounce impact elasticity | 89 | 89 | 90 | 91 | 91 | 90 | 81 | 82 | 82 | 83 | 80 | 80 |
| Compression | 101 | 101 | 102 | 104 | 100 | 101 | 72 | 73 | 73 | 74 | 73 | 72 |
| Feeling upon hitting** | E | E | E | E | E | E | B | B | B | B | B | B |

**E: Excellent. B: Bad

TABLE 20

Formulating Ratios of Cores

| | Examples | | | |
|---|---|---|---|---|
| | 179 | 180 | 181 | 182 |
| Rubber (BR) *1 | 100 | 100 | 100 | 100 |
| Zinc oxide *4 | 15 | 15 | 15 | 15 |
| Aerosolizable silica *5 | 10 | 10 | 10 | 10 |
| Dicumyl peroxide | 5 | 5 | 5 | 5 |
| Antioxidant | 4 | 4 | 4 | 4 |
| Stearic acid | 2 | 2 | 2 | 2 |
| Surface treated fibers A | 10 | 15 | 20 | 25 |
| Durability index | 115 | 117 | 119 | 120 |
| Bounce impact elasticity | 92 | 93 | 93 | 94 |
| Compression | 103 | 104 | 104 | 105 |
| Feeling upon hitting** | E | E | E | E |

**E: Excellent

TABLE 21

Formulating Ratios of Spherical Cores

| | Examples | | | | | | Comparative Experiments | | | | | |
|---|---|---|---|---|---|---|---|---|---|---|---|---|
| | 183 | 184 | 185 | 186 | 187 | 188 | 62 | 63 | 64 | 65 | 66 | 67 |
| Rubber (BR) *1 | 100 | 100 | 100 | 100 | 100 | 100 | 100 | 100 | 100 | 100 | 100 | 100 |
| Zinc acrylate | 10 | 10 | 10 | 10 | 8 | 8 | 10 | 10 | 10 | 10 | 10 | 10 |
| Zinc oxide *4 | 15 | 15 | 15 | 15 | 15 | 15 | 15 | 15 | 15 | 15 | 15 | 15 |
| Aerosolizable silica *5 | 10 | 10 | 10 | 10 | — | — | 10 | 10 | 10 | 10 | 10 | 30 |
| Dicumyl peroxide | 5 | 5 | 5 | 5 | 5 | 5 | 5 | 5 | 5 | 5 | 5 | 5 |
| Antioxidant | 4 | 4 | 4 | 4 | 4 | 4 | 4 | 4 | 4 | 4 | 4 | 4 |
| Stearic acid | 2 | 2 | 2 | 2 | 2 | 2 | 2 | 2 | 2 | 2 | 2 | 2 |
| Potassium titanate fibers (untreated) | — | — | — | — | — | — | 10 | 15 | 20 | 25 | — | — |
| Surface treated fibers | | | | | | | | | | | | |

TABLE 21-continued

| | Formulating Ratios of Spherical Cores | | | | | | | | | | | |
|---|---|---|---|---|---|---|---|---|---|---|---|---|
| | Examples | | | | | | Comparative Experiments | | | | | |
| | 183 | 184 | 185 | 186 | 187 | 188 | 62 | 63 | 64 | 65 | 66 | 67 |
| A | 10 | 15 | 20 | 25 | — | — | — | — | — | — | — | — |
| E | — | — | — | — | — | — | — | — | — | — | 20 | — |
| F | — | — | — | — | 20 | — | — | — | — | — | — | — |
| G | — | — | — | — | — | 20 | — | — | — | — | — | — |
| Durability index | 117 | 119 | 121 | 122 | 124 | 123 | 54 | 54 | 54 | 54 | 53 | 50 |
| Bounce impact elasticity | 93 | 94 | 94 | 95 | 94 | 94 | 82 | 82 | 83 | 84 | 82 | 81 |
| Compression | 104 | 105 | 106 | 106 | 105 | 104 | 81 | 82 | 82 | 83 | 83 | 79 |
| Feeling upon hitting** | E | E | E | E | E | E | B | B | B | B | B | B |

**E: Excellent, B: Bad

TABLE 22

| Formulating Ratios of Spherical Cores | | | | |
|---|---|---|---|---|
| | Examples | | | |
| | 189 | 190 | 191 | 192 |
| Rubber (BR) *1 | 100 | 100 | 100 | 100 |
| Zinc acrylate | 10 | 10 | 10 | 10 |
| Zinc oxide *4 | 15 | 15 | 15 | 15 |
| Aerosolizable silica *5 | 10 | 10 | 10 | 10 |
| Dicumyl peroxide | 5 | 5 | 5 | 5 |
| Antioxidant | 4 | 4 | 4 | 4 |
| Stearic acid | 2 | 2 | 2 | 2 |
| Surface treated fibers A | 10 | 15 | 20 | 25 |
| Durability index | 126 | 127 | 129 | 131 |
| Bounce impace elasticity | 101 | 102 | 103 | 106 |
| Compression | 104 | 106 | 106 | 108 |
| Feeling upon hitting** | E | E | E | E |

**E: Excellent

TABLE 23

| Formulating Ratios of Cover Layers | | | | | | | | | | | |
|---|---|---|---|---|---|---|---|---|---|---|---|
| | Examples | | | | | | | | | | |
| | 193 | 194 | 195 | 196 | 197 | 198 | 199 | 200 | 201 | 202 | 203 |
| Ionomer resin | 100 | 100 | 100 | 100 | 100 | — | — | — | — | — | — |
| Trans-polyisoprene resin | — | — | — | — | — | 100 | 100 | 100 | 100 | — | — |
| Rubber (BR) *1 | — | — | — | — | — | — | — | — | — | 100 | 100 |
| Zinc oxide *4 | — | — | — | — | — | — | — | — | — | 15 | 15 |
| Zinc acrylate | — | — | — | — | — | — | — | — | — | 8 | 8 |
| Sulfur | — | — | — | — | — | 1 | 1 | 1 | 1 | — | — |
| Vulcanization accelerator | — | — | — | — | — | 15 | 15 | 15 | 15 | — | — |
| Titanium dioxide | 20 | — | — | — | — | — | — | — | — | — | — |
| Dicumyl peroxide | — | — | — | — | — | — | — | — | — | 5 | 5 |
| Antioxidant | — | — | — | — | — | — | — | — | — | 4 | 4 |
| Stearic acid | — | — | — | — | — | — | — | — | — | 2 | 2 |
| Potassium titanate fibers (untreated) | — | 20 | — | — | — | — | — | — | — | — | — |
| Surface treated fibers | | | | | | | | | | | |
| A | — | — | 20 | — | — | — | — | — | — | 20 | — |
| B | — | — | — | 30 | — | 10 | — | — | — | — | 20 |
| C | — | — | — | — | — | — | 20 | — | — | — | — |
| D | — | — | — | — | — | — | — | 30 | — | — | — |
| E | — | — | — | — | 20 | — | — | — | 20 | — | — |
| Durability index | 109 | 111 | 132 | 131 | 115 | 117 | 119 | 122 | 107 | 126 | 124 |
| Bounce impact elasticity | 84 | 86 | 106 | 106 | 104 | 106 | 107 | 107 | 102 | 103 | 107 |
| Compression | 84 | 101 | 102 | 101 | 100 | 107 | 105 | 106 | 106 | 101 | 103 |
| Feeling upon hitting** | E | E | E | E | E | E | E | E | E | E | E |

**E: Excellent

TABLE 24

| | Examples | | | | | | | | | | |
|---|---|---|---|---|---|---|---|---|---|---|---|
| | 204 | 205 | 206 | 207 | 208 | 209 | 210 | 211 | 212 | 213 | 214 |
| Rubber | | | | | | | | | | | |
| BR *1 | 100 | 100 | 30 | — | — | 10 | 100 | 50 | 10 | 20 | — |
| SBR *2 | — | — | 70 | 100 | — | 90 | — | 50 | 90 | 80 | 50 |
| IR *3 | — | — | — | — | 100 | — | — | — | — | — | 50 |
| Acrylic acid | — | — | — | 20 | — | — | — | — | — | — | — |
| Zinc acrylate | 20 | 25 | 10 | — | — | 10 | — | — | — | — | — |
| Carcium methacrylate | — | — | — | — | 25 | — | — | — | — | — | — |
| Zinc oxide *4 | 10 | 5 | 15 | 10 | 5 | 15 | 15 | 15 | 15 | 15 | 20 |
| Aerosolizable silica *5 | — | — | 10 | 15 | 10 | 10 | 10 | — | — | — | — |
| Aerosolizable titanium dioxide | 15 | 10 | — | — | — | — | — | 10 | 10 | 10 | 15 |
| Dicumyl peroxide | 5 | 5 | — | 5 | 5 | 5 | — | 5 | 5 | 5 | 5 |
| n-Butyl-bis(t-butyl-peroxy)valerate | — | — | 5 | — | — | — | 5 | — | — | — | — |
| Antioxidant | 4 | 4 | 4 | 4 | 4 | 4 | 4 | 4 | 4 | 4 | 4 |
| Stearic acid | 2 | 2 | 2 | 2 | 2 | 2 | 2 | 2 | 2 | 2 | 2 |
| Surface treated fibers | | | | | | | | | | | |

TABLE 24-continued

|  | \multicolumn{11}{c}{Examples} |
| --- | --- | --- | --- | --- | --- | --- | --- | --- | --- | --- | --- |
|  | 204 | 205 | 206 | 207 | 208 | 209 | 210 | 211 | 212 | 213 | 214 |
| A | 30 | — | — | — | — | 25 | — | — | 20 | — | 20 |
| B | — | 5 | — | — | 15 | — | 20 | — | — | 20 | — |
| C | — | — | 10 | — | — | — | — | 25 | — | — | — |
| D | — | — | — | 15 | — | — | — | — | — | — | — |
| Durability index | 135 | 124 | 126 | 120 | 123 | 128 | 126 | 141 | 146 | 144 | 144 |
| Bounce impact elasticity | 106 | 99 | 101 | 107 | 107 | 108 | 108 | 108 | 107 | 107 | 105 |
| Compression | 102 | 101 | 102 | 106 | 106 | 107 | 107 | 108 | 108 | 107 | 109 |
| Feeling upon hitting** | E | E | E | E | E | E | E | E | E | E | E |

**E: Excellent

TABLE 25

Formulating Ratios of Cover Layers

|  | \multicolumn{10}{c}{Examples} |
| --- | --- | --- | --- | --- | --- | --- | --- | --- | --- | --- |
|  | 215 | 216 | 217 | 218 | 219 | 220 | 221 | 222 | 223 | 224 |
| Ionomer resin | 100 | 100 | 100 | 100 | 100 | — | — | — | — | — |
| Trans-polyisoprene resin | — | — | — | — | — | 100 | 100 | 100 | — | — |
| Rubber (BR) *1 | — | — | — | — | — | — | — | — | 100 | 100 |
| Zinc oxide *4 | — | — | — | — | — | — | — | — | 10 | 10 |
| Zinc acrylate | — | — | — | — | — | — | — | — | 9 | 9 |
| Sulfur | — | — | — | — | — | 1 | 1 | 1 | — | — |
| Vulcanization accelerator | — | — | — | — | — | 15 | 15 | 15 | — | — |
| Dicumyl peroxide | — | — | — | — | — | — | — | — | 5 | 5 |
| Antioxidant | — | — | — | — | — | — | — | — | 4 | 4 |
| Stearic acid | — | — | — | — | — | — | — | — | 2 | 2 |
| Surface treated fibers |  |  |  |  |  |  |  |  |  |  |
| A | 20 | — | — | — | 30 | — | — | 10 | — | — |
| B | — | 20 | — | — | — | — | 10 | — | — | — |
| C | — | — | 20 | — | — | 10 | — | — | 20 | — |
| D | — | — | — | 20 | — | — | — | — | — | 20 |
| Durability index | 103 | 104 | 105 | 106 | 108 | 104 | 107 | 110 | 106 | 108 |
| Bounce impact elasticity | 115 | 116 | 117 | 118 | 117 | 116 | 118 | 119 | 100 | 101 |
| Compression | 123 | 124 | 128 | 126 | 122 | 120 | 122 | 124 | 121 | 119 |
| Feeling upon hitting** | E | E | E | E | E | E | E | E | E | E |

**E: Excellent

TABLE 26

Formulating Ratios of Cores

|  | \multicolumn{6}{c}{Examples} |
| --- | --- | --- | --- | --- | --- | --- |
|  | 225 | 226 | 227 | 228 | 229 | 230 |
| Rubber (BR) *1 | 100 | 100 | 100 | 100 | 100 | 100 |
| Zinc acrylate | 10 | 10 | 10 | 10 | 10 | 10 |
| Zinc oxide *4 | 15 | 15 | 15 | 15 | 15 | 15 |
| Aerosolizable silica *5 | 10 | 10 | 10 | 10 | 10 | 30 |
| Dicumyl peroxide | 5 | 5 | 5 | 5 | 5 | 5 |
| Antioxidant | 4 | 4 | 4 | 4 | 4 | 4 |
| Stearic acid | 2 | 2 | 2 | 2 | 2 | 2 |
| Potassium titanate fibers (untreated) | 10 | 15 | 20 | 25 | — | — |
| Surface treated fibers E | — | — | — | — | 20 | — |
| Durability index | 99 | 99 | 98 | 98 | 96 | 97 |
| Bounce impact elasticity | 97 | 98 | 101 | 101 | 98 | 99 |
| Compression | 111 | 108 | 109 | 108 | 108 | 106 |
| Feeling upon hitting** | G | G | G | G | G | G |

**G: Good

TABLE 27

Formulating Ratios of Cover Layers

|  | \multicolumn{8}{c}{Comparative Experiments} |
| --- | --- | --- | --- | --- | --- | --- | --- | --- |
|  | 68 | 69 | 70 | 71 | 72 | 73 | 74 | 75 |
| Ionomer resin | 100 | 100 | 100 | 100 | 100 | — | — | — |
| Trans-polyisoprene resin | — | — | — | — | — | 100 | 100 | 100 |
| Sulfur | — | — | — | — | — | 1 | 1 | 1 |
| Vulcanization accelerator | — | — | — | — | — | 15 | 15 | 15 |
| Titanium dioxide | 20 | — | 30 | — | — | 30 | — | 10 |
| Potassium titanate fibers (untreated) | — | 20 | — | 30 | — | — | 30 | — |
| Surface treated fibers E | — | — | — | — | 30 | — | — | — |
| Durability index | 93 | 95 | 94 | 96 | 97 | 85 | 87 | 81 |
| Bounce impact elasticity | 90 | 92 | 96 | 94 | 95 | 90 | 91 | 88 |
| Compression | 108 | 110 | 112 | 111 | 111 | 108 | 107 | 105 |
| Feeling upon hitting** | B | B | B | B | B | B | B | B |

**B: Bad

TABLE 28

Formulating Ratios of Cover Layers

|  | \multicolumn{10}{c}{Examples} |
| --- | --- | --- | --- | --- | --- | --- | --- | --- | --- | --- |
|  | 231 | 232 | 233 | 234 | 235 | 236 | 237 | 238 | 239 | 240 |
| Ionomer resin | 100 | 100 | 100 | 100 | 100 | — | — | — | — | — |
| Trans-polyisoprene resin | — | — | — | — | — | 100 | 100 | 100 | — | — |
| Rubber (BR) *1 | — | — | — | — | — | — | — | — | 100 | 100 |
| Zinc oxide *4 | — | — | — | — | — | — | — | — | 10 | 10 |

TABLE 28-continued

| | Formulating Ratios of Cover Layers Examples | | | | | | | | | |
|---|---|---|---|---|---|---|---|---|---|---|
| | 231 | 232 | 233 | 234 | 235 | 236 | 237 | 238 | 239 | 240 |
| Zinc acrylate | — | — | — | — | — | — | — | — | 9 | 9 |
| Sulfur | — | — | — | — | — | 1 | 1 | 1 | — | — |
| Vulcanization accelerator | — | — | — | — | — | 15 | 15 | 15 | — | — |
| Dicumyl peroxide | — | — | — | — | — | — | — | — | 5 | 5 |
| Antioxidant | — | — | — | — | — | — | — | — | 4 | 4 |
| Stearic acid | — | — | — | — | — | — | — | — | 2 | 2 |
| Surface treated fibers | | | | | | | | | | |
| A | 20 | — | — | — | 30 | — | — | 10 | — | — |
| B | — | 20 | — | — | — | — | 10 | — | — | — |
| C | — | — | 20 | — | — | 10 | — | — | — | — |
| D | — | — | — | 20 | — | — | — | — | — | — |
| E | — | — | — | — | — | — | — | — | 20 | — |
| F | — | — | — | — | — | — | — | — | — | 20 |
| Durability index | 107 | 105 | 106 | 107 | 107 | 104 | 106 | 105 | 106 | 107 |
| Bounce impact elasticity | 117 | 116 | 116 | 116 | 115 | 110 | 108 | 109 | 109 | 108 |
| Compression | 124 | 122 | 123 | 123 | 122 | 121 | 122 | 123 | 121 | 120 |
| Feeling upon hitting** | E | E | E | E | E | E | E | E | E | E |

**E: Excellent

TABLE 29

| | Formulating Ratios of Cover Layers Comparative Experiments | | | | | | | |
|---|---|---|---|---|---|---|---|---|
| | 76 | 77 | 78 | 79 | 80 | 81 | 82 | 83 |
| Ionomer resin | 100 | 100 | 100 | 100 | 100 | — | — | — |
| Trans-polyisoprene resin | — | — | — | — | — | 100 | 100 | 100 |
| Sulfur | — | — | — | — | — | 1 | 1 | 1 |
| Vulcanization accelerator | — | — | — | — | — | 15 | 15 | 15 |
| Titanium dioxide | 20 | — | 30 | — | — | 30 | — | 20 |
| Potassium titanate fibers (untreated) | — | 20 | — | 30 | — | — | 30 | — |
| Surface treated fibers E | — | — | — | — | 30 | — | — | — |
| Durability index | 94 | 96 | 95 | 97 | 95 | 85 | 88 | 83 |
| Bounce impact elasticity | 89 | 91 | 90 | 92 | 91 | 90 | 92 | 90 |
| Compression | 109 | 111 | 113 | 113 | 112 | 108 | 107 | 103 |
| Feeling upon hitting** | B | B | B | B | B | B | B | B |

**B: Bad

TABLE 30

| | Formulating Ratios of Cover Layers Examples | | | | | | | | | |
|---|---|---|---|---|---|---|---|---|---|---|
| | 241 | 242 | 243 | 244 | 245 | 246 | 247 | 248 | 249 | 250 |
| Ionomer resin | 100 | 100 | 100 | 100 | 100 | — | — | — | — | — |
| Trans-polyisoprene resin | — | — | — | — | — | 100 | 100 | 100 | — | — |
| Rubber (BR) *1 | — | — | — | — | — | — | — | — | 100 | 100 |
| Zinc oxide *4 | — | — | — | — | — | — | — | — | 10 | 10 |
| Zinc acrylate | — | — | — | — | — | — | — | — | 9 | 9 |
| Sulfur | — | — | — | — | — | 1 | 1 | 1 | — | — |
| Vulcanization accelerator | — | — | — | — | — | 15 | 15 | 15 | — | — |
| Dicumyl peroxide | — | — | — | — | — | — | — | — | 5 | 5 |
| Antioxidant | — | — | — | — | — | — | — | — | 4 | 4 |
| Stearic acid | — | — | — | — | — | — | — | — | 2 | 2 |
| Surface treated fibers | | | | | | | | | | |
| A | 20 | — | — | — | 30 | — | — | — | 20 | — |
| B | — | 20 | — | — | — | — | — | 10 | — | 20 |
| C | — | — | 20 | — | — | — | 10 | — | — | — |
| D | — | — | — | 20 | — | 10 | — | — | — | — |
| Durability index | 103 | 101 | 101 | 102 | 108 | 102 | 101 | 100 | 105 | 106 |
| Bounce impact elasticity | 109 | 108 | 108 | 109 | 108 | 99 | 100 | 99 | 100 | 99 |
| Compression | 123 | 124 | 124 | 125 | 128 | 122 | 123 | 121 | 121 | 122 |
| Feeling upon hitting** | E | E | E | E | E | E | E | E | E | E |

**E: Excellent

TABLE 31

| | Formulating Ratios of Cover Layers Comparative Experiments | | | | | | | |
|---|---|---|---|---|---|---|---|---|
| | 84 | 85 | 86 | 87 | 88 | 89 | 90 | 91 |
| Ionomer resin | 100 | 100 | 100 | 100 | 100 | — | — | — |
| Trans-polyisoprene resin | — | — | — | — | — | 100 | 100 | 100 |
| Sulfur | — | — | — | — | — | 1 | 1 | 1 |
| Vulcanization accelerator | — | — | — | — | — | 15 | 15 | 15 |
| Titanium dioxide | 20 | — | 30 | — | — | 30 | — | 20 |
| Potassium titanate fibers (untreated) | — | 20 | — | 30 | — | — | 30 | — |
| Surface treated fibers E | — | — | — | — | 30 | — | — | — |

TABLE 31-continued

| | Formulating Ratios of Cover Layers | | | | | | | |
|---|---|---|---|---|---|---|---|---|
| | Comparative Experiments | | | | | | | |
| | 84 | 85 | 86 | 87 | 88 | 89 | 90 | 91 |
| Durability index | 81 | 82 | 81 | 83 | 75 | 76 | 77 | 73 |
| Bounce impact elasticity | 82 | 82 | 83 | 84 | 84 | 85 | 86 | 81 |
| Compression | 101 | 102 | 102 | 101 | 98 | 97 | 96 | 95 |
| Feeling upon hitting** | B | B | B | B | B | B | B | B |

**B: Bad

What is claimed is:

1. A rubber composition for a cover layer of a golf ball, which comprises at least one natural and/or synthetic rubber component(s) and alkali metal titanate fibers subjected to a surface treatment with about 0.05 to 10% by weight based on the weight of the fibers of a surface treating agent prior to mixing with said rubber component(s), said surface treating agent being selected from the group consisting of compounds represented by the formula I:

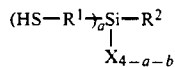
$$(HS-R^1)_a Si-R^2_{\phantom{a}} X_{4-a-b}$$ \hfill (I)

wherein each $R^1$ independently represents a substituted or unsubstituted divalent hydrocarbon group of 2 to 6 carbon atoms, each $R^2$ independently represents a substituted or unsubstituted monovalent hydrocarbon group, each X independently represents a hydrolyzable group, a is an integer of from 1 to 3, and b is an integer of from 0 to 2 with the proviso that $1 \leq (a+b) \leq 3$;
and compounds represented by the formula II:

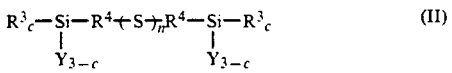
$$R^3_c-Si-R^4(-S)_n R^4-Si-R^3_c \atop Y_{3-c} \phantom{-Si-R^4(-S)_n R^4-Si-} Y_{3-c}$$ \hfill (II)

wherein each $R^3$ is independently represents a substituted or unsubstituted monovalent hydrocarbon group, each $R^4$ independently represents a substituted or unsubstituted hydrocarbon group of 2 to 4 carbon atoms, each Y independently represents a hydrolyzable group, c is an integer of from 0 to 2 and n is an integer of from 1 to 6.

2. A rubber composition according to claim 1, which comprises 100 weight parts of the rubber component(s) and 2 to 100 weight parts of the alkali metal titanate fibers.

3. A rubber composition according to claim 1, wherein said surface treating agent is selected from the group consisting of:
bis(3-triethoxysilylpropyl) tetrasulfide;
γ-mercaptopropyltrimethoxysilane;
γ-mercaptopropyltriethoxysilane;
bis(3-trimethoxysilylpropyl) tetrasulfide; and
bis(mercaptopropyl) tetramethyldisiloxane.

4. A rubber composition according to claim 1, wherein the rubber component is ionomer resin.

5. A rubber composition according to claim 1, wherein the rubber component is trans-polyisoprene resin.

6. A rubber composition according to claim 1, wherein the alkali metal titanate fibers are potassium titanate fibers.

* * * * *